United States Patent
Kim et al.

(10) Patent No.: US 12,490,186 B2
(45) Date of Patent: Dec. 2, 2025

(54) ACQUISITION OF IMPORTANT INFORMATION IN POWER-SAVING MODE

(71) Applicant: LG Electronics Inc., Seoul (KR)

(72) Inventors: Namyeong Kim, Seoul (KR); Jeongki Kim, Seoul (KR); Jinsoo Choi, Seoul (KR); Taewon Song, Seoul (KR); Insun Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 381 days.

(21) Appl. No.: 18/018,457

(22) PCT Filed: Jul. 22, 2021

(86) PCT No.: PCT/KR2021/009467
§ 371 (c)(1),
(2) Date: Jan. 27, 2023

(87) PCT Pub. No.: WO2022/025520
PCT Pub. Date: Feb. 3, 2022

(65) Prior Publication Data
US 2023/0354187 A1     Nov. 2, 2023

(30) Foreign Application Priority Data

| Jul. 28, 2020 | (KR) | 10-2020-0093914 |
| Jul. 28, 2020 | (KR) | 10-2020-0093929 |
| Aug. 11, 2020 | (KR) | 10-2020-0100671 |
| Sep. 21, 2020 | (KR) | 10-2020-0121599 |
| Nov. 26, 2020 | (KR) | 10-2020-0161415 |

(Continued)

(51) Int. Cl.
*H04W 52/02* (2009.01)
*H04W 76/15* (2018.01)
*H04W 84/12* (2009.01)

(52) U.S. Cl.
CPC ....... *H04W 52/0206* (2013.01); *H04W 76/15* (2018.02); *H04W 84/12* (2013.01)

(58) Field of Classification Search
CPC . H04W 52/0206; H04W 76/15; H04W 84/12; H04W 8/24; H04W 52/02; Y02D 30/70
See application file for complete search history.

(56) References Cited

U.S. PATENT DOCUMENTS

| 2018/0077731 A1 | 3/2018 | Ghosh |
| 2018/0317178 A1 | 11/2018 | Wong et al. |
| 2018/0368118 A1 | 12/2018 | Hsu et al. |

(Continued)

FOREIGN PATENT DOCUMENTS

| KR | 101973746 | 9/2019 |

*Primary Examiner* — Kibrom T Hailu
(74) *Attorney, Agent, or Firm* — Fish & Richardson P.C.

(57) ABSTRACT

In a Wireless Local Area Network system, an STA MLD may include a first STA and a second STA, and an access point (AP) MLD may include a first AP and a second AP. The first STA and the first AP operate over a first link, the second STA and the second AP operate over a second link, and the second STA may be in a doze state. The first STA may receive, through the first link, a notice frame including information related to a critical update that has occurred in the second AP. The second STA may acquire, from the first STA, information related to the critical update. The notice frame may include a management frame.

11 Claims, 50 Drawing Sheets

(30) Foreign Application Priority Data

Dec. 30, 2020 (KR) .......................... 10-2020-0187715
Feb. 17, 2021 (KR) .......................... 10-2021-0021186

(56) References Cited

U.S. PATENT DOCUMENTS

| | | |
|---|---|---|
| 2019/0297567 A1 | 9/2019 | Park et al. |
| 2021/0007168 A1* | 1/2021 | Asterjadhi ........ H04W 52/0235 |
| 2021/0014776 A1* | 1/2021 | Patil ...................... H04L 1/1621 |
| 2022/0287122 A1* | 9/2022 | Wang ...................... H04W 8/22 |

* cited by examiner

FIG. 1
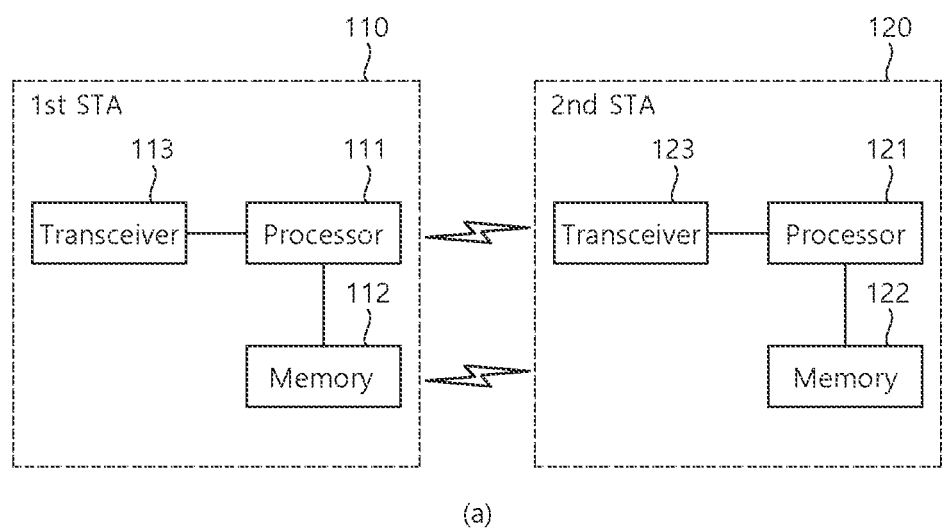
(a)
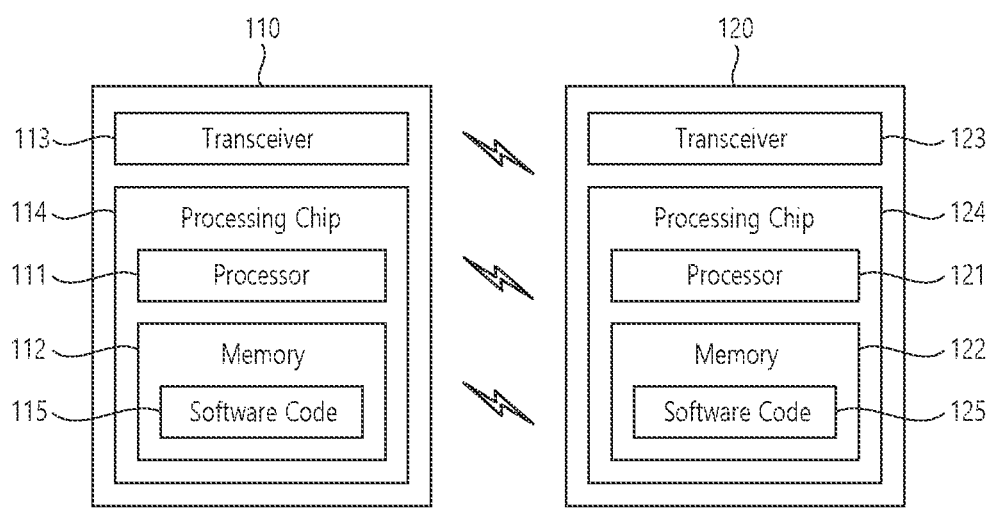
(b)

FIG. 2
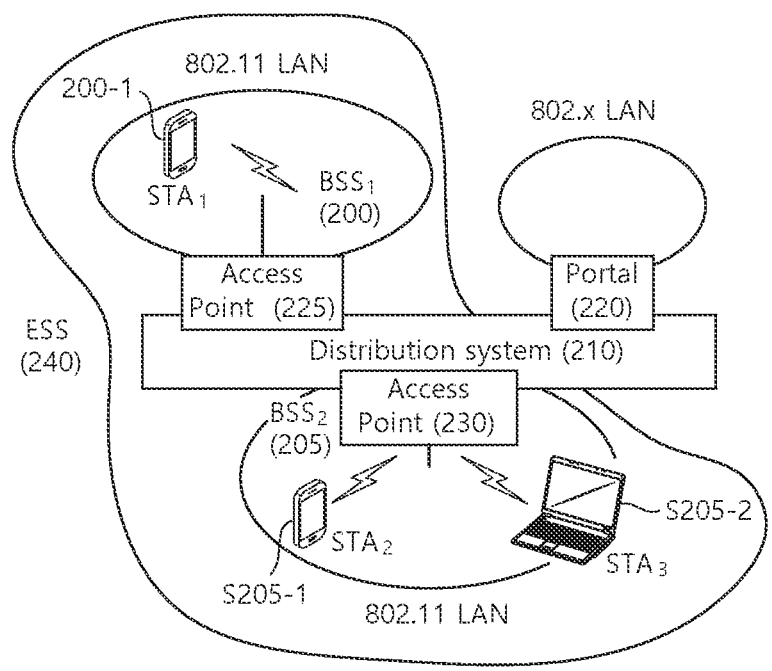
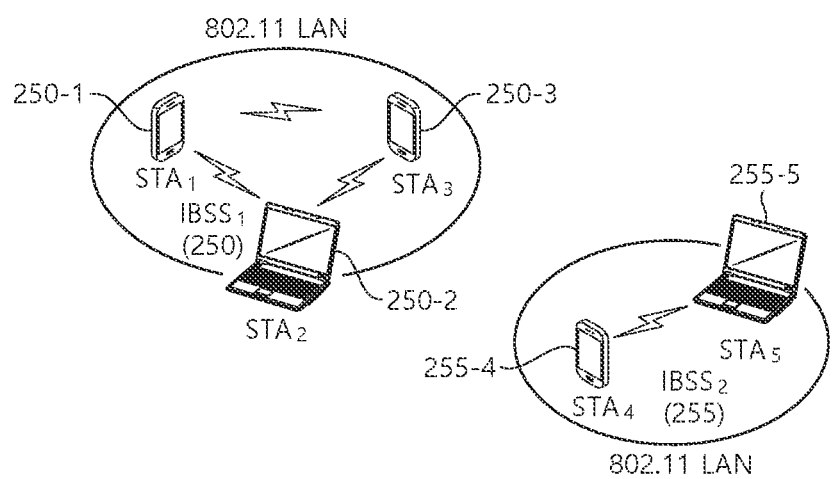

FIG. 6

| Multi-link STA |||
|---|---|---|
| 5GHz | 6GHz ||
| STA 1 Link 1 | STA 2 Link 2 | STA 3 Link 3 |

FIG. 9

| Probe Response Frame | Frame Control | Duration | A1 | A2 | A3 | Sequence Control | HT Control | ... | Multi-Link Element | Change Sequence element | Channel Switch Announcement element | ... | FCS |

ACQUISITION OF IMPORTANT INFORMATION IN POWER-SAVING MODE

CROSS-REFERENCE TO RELATED APPLICATIONS

This application is a National Stage application under 35 U.S.C. § 371 of International Application No. PCT/KR2021/009467, filed on Jul. 22, 2021, which claims the benefit of Korean Patent Application No. 10-2020-0093914, filed on Jul. 28, 2020, Korean Patent Application No. 10-2020-0093929, filed on Jul. 28, 2020, Korean Patent Application No. 10-2020-0100671, filed on Aug. 11, 2020, Korean Patent Application No. 10-2020-0121599, filed on Sep. 21, 2020, Korean Patent Application No. 10-2020-0161415, filed on Nov. 26, 2020, Korean Patent Application No. 10-2020-0187715, filed on Dec. 30, 2020, and Korean Patent Application No. 10-2021-0021186. Filed on Feb. 17, 2021. The disclosures of the prior applications are incorporated by reference in their entirety.

TECHNICAL FIELD

The present specification relates to a method for obtaining critical information when a multi-link device (MLD) operates in a power saving mode in a multi-link environment in a wireless local area network (WLAN) system.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

In a wireless local area network (WLAN) system according to various embodiments, a STA MLD may include a first STA and a second STA, and an access point (AP) MLD may include a first AP and a second AP. The first STA and the first AP may operate in a first link, the second STA and the second AP may operate in a second link, and the second STA may be in a doze state. The first STA may receive a notification frame including information related to a critical update generated from the second AP through the first link. The second STA may obtain information related to the critical update from the first STA. The notification frame may include a management frame.

According to an example of the present specification, when a critical update occurs in an AP because one STA of the MLD is in a doze state, the STA receives information related to the critical update directly from the AP, and the critical update through another link Information related to the critical update may be obtained from another STA within the same MLD that has received related information.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 6 shows an example of a structure of a non-AP MLD.

FIG. 9 is a diagram illustrating an embodiment of a frame format when using a probe response frame as an announcement frame.

DETAILED DESCRIPTION

Figure 3:
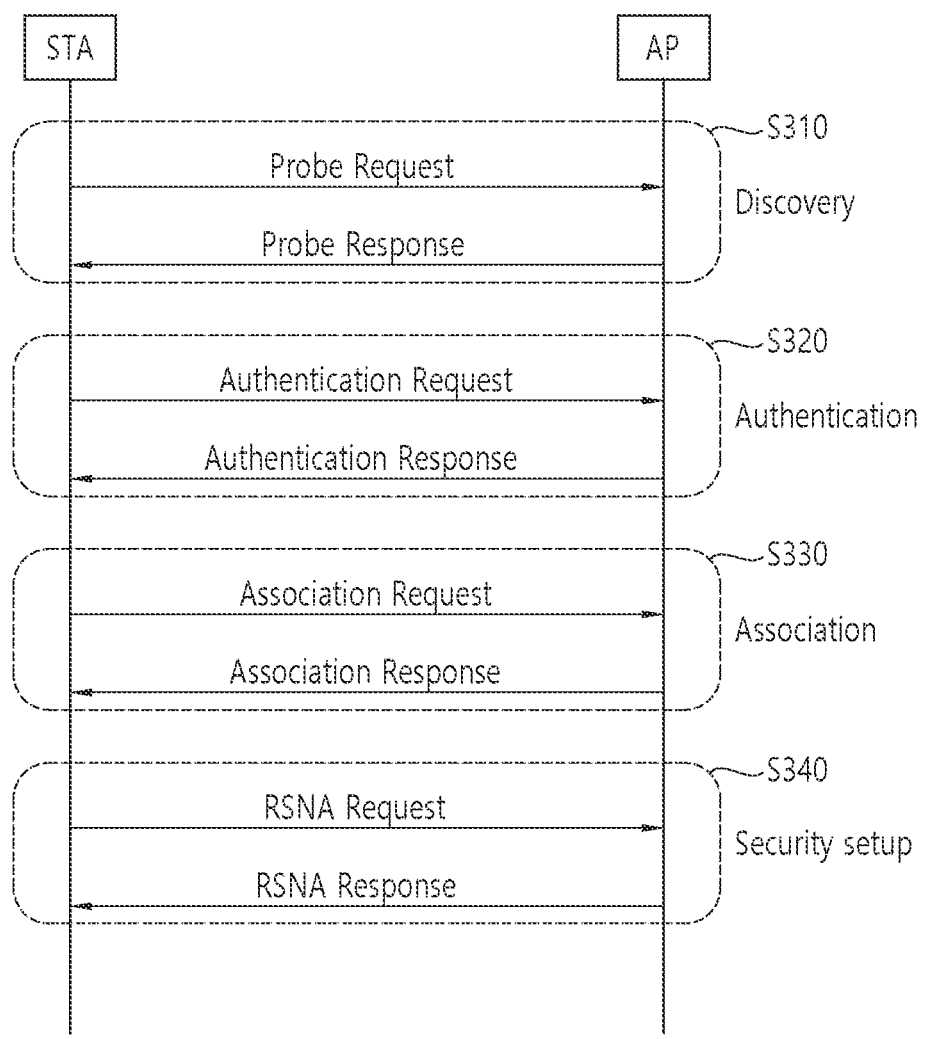
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Hereinafter, the PPDU transmitted/received by the STA of the present specification will be described.

Figure 4:
FIG. 4 illustrates an example of a PPDU used in an IEEE standard.

FIG. 4 illustrates an example of a PPDU used in the present specification.

The PPDU of FIG. 4 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 4 may indicate the entirety or part of a PPDU type used in the EHT system. For example, the example of FIG. 4 may be used for both of a single-user (SU) mode and a multi-user (MU) mode. In other words, the PPDU of FIG. 4 may be a PPDU for one receiving STA or a plurality of receiving STAs. When the PPDU of FIG. 4 is used for a trigger-based (TB) mode, the EHT-SIG of FIG. 4 may be omitted. In other words, a STA which has received a trigger frame for uplink-MU (UL-MU) may transmit the PPDU in which the EHT-SIG is omitted in the example of FIG. 4.

In FIG. 4, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 4 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 4, the L-LTE and the L-STF may be the same as those in the conventional fields.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 4. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

The common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

The common field of the EHT-SIG may include a CRC bit and a tail bit. A length of the CRC bit may be determined as 4 bits. A length of the tail bit may be determined as 6 bits, and may be set to '000000'.

The common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 4. The PPDU of FIG. 4 may be used to transmit/receive frames of various types. For example, the PPDU of FIG. 4 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 4 may be used for a management frame. An example of the management frame may include a beacon frame, a (re-)association request frame, a (re-)association response frame, a probe request frame, and a probe response frame. For example, the PPDU of FIG. 4 may be used for a data frame. For example, the PPDU of FIG. 4 may be used to simultaneously transmit at least two or more of the control frame, the management frame, and the data frame.

Figure 5:
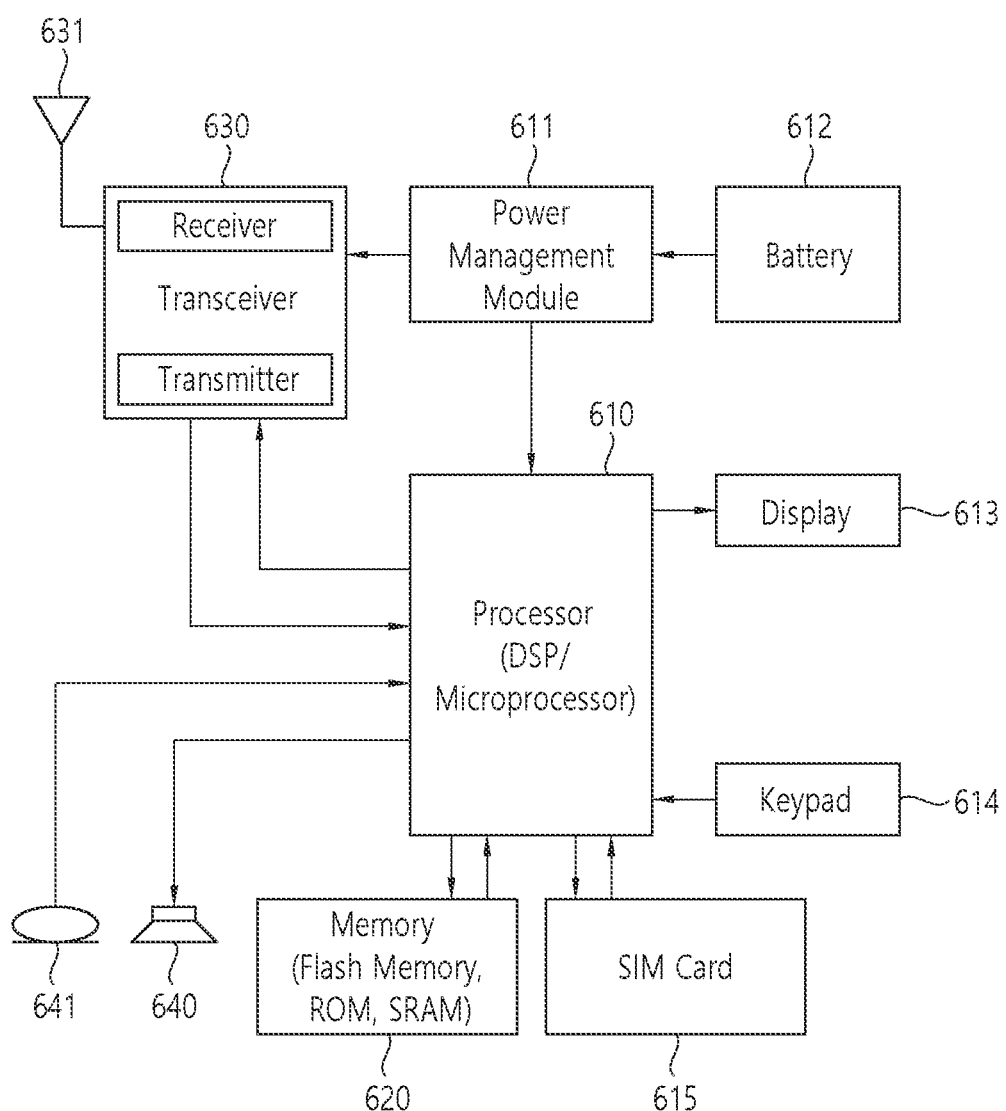
FIG. 5 illustrates an example of a modified transmission device and/or receiving device of the present specification.

FIG. 5 illustrates an example of a modified transmission device and/or receiving device of the present specification.

Each device/STA of the sub-figure (a)/(b) of FIG. 1 may be modified as shown in FIG. 5. A transceiver 630 of FIG. 5 may be identical to the transceivers 113 and 123 of FIG. 1. The transceiver 630 of FIG. 5 may include a receiver and a transmitter.

A processor 610 of FIG. 5 may be identical to the processors 111 and 121 of FIG. 1. Alternatively, the processor 610 of FIG. 5 may be identical to the processing chips 114 and 124 of FIG. 1.

A memory 620 of FIG. 5 may be identical to the memories 112 and 122 of FIG. 1. Alternatively, the memory 620 of FIG. 5 may be a separate external memory different from the memories 112 and 122 of FIG. 1.

Referring to FIG. 5, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 5, a speaker 640 may output a result related to a sound processed by the processor 610. A microphone 641 may receive an input related to a sound to be used by the processor 610.

Hereinafter, technical features of a multi-link (ML) supported by a STA of the present disclosure will be described.

The STA (AP and/or non-AP STA) of the present disclosure may support multi-link (ML) communication. ML communication may refer to communication supporting a plurality of links. The link related to ML communication may include channels of the 2.4 GHz band shown, the 5 GHz band, and the 6 GHz band (for example, 20/40/80/160/240/320 MHz channels).

A plurality of links used for ML communication may be set in various ways. For example, a plurality of links supported by one STA for ML communication may be a plurality of channels in a 2.4 GHz band, a plurality of channels in a 5 GHz band, and a plurality of channels in a 6 GHz band. Alternatively, a plurality of links supported by one STA for ML communication may be a combination of at least one channel in the 2.4 GHz band (or 5 GHz/6 GHz band) and at least one channel in the 5 GHz band (or 2.4 GHz/6 GHz band). Meanwhile, at least one of the plurality of links supported by one STA for ML communication may be a channel to which preamble puncturing is applied.

The STA may perform an ML setup to perform ML communication. The ML setup may be performed based on a management frame or control frame such as a Beacon, a Probe Request/Response, an Association Request/Response, and the like. For example, information about ML setup may be included in an element field included in a Beacon, a Probe Request/Response, an Association Request/Response, and the like.

When ML setup is completed, an enabled link for ML communication may be determined. The STA may perform frame exchange through at least one of a plurality of links determined as an enabled link. For example, the enabled link may be used for at least one of a management frame, a control frame, and a data frame.

When one STA supports multiple links, a transceiver supporting each link may operate as one logical STA. For example, one STA supporting two links may be expressed as one Multi Link Device (MLD) including a first STA for the first link and a second STA for the second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

Hereinafter, more specific features related to the ML setup are described.

The MLD (AP MLD and/or non-AP MLD) may transmit, through ML setup, information on a link that the corresponding MLD can support. Link information may be configured in various ways. For example, information on the link may include at least one of 1) information on whether the MLD (or STA) supports simultaneous RX/TX operation, 2) information on the number/upper limit of uplink/downlink links supported by the MLD (or STA), 3) information on the location/band/resource of the uplink/downlink Link supported by the MLD (or STA), 4) information on the frame type (management, control, data, etc.) available or preferred in at least one uplink/downlink link, 5) information on ACK policy available or preferred in at least one uplink/downlink link, and 6) information on an available or preferred traffic identifier (TID) in at least one uplink/downlink Link. The TID is related to the priority of traffic data and is expressed as eight types of values according to the conventional wireless LAN standard. That is, eight TID values corresponding to four access categories (ACs) (AC_Background (AC_BK), AC_Best Effort (AC_BE), AC_Video (AC_VI), AC_Voice (AC_VO)) according to the conventional WLAN standard may be defined.

For example, it may be preset that all TIDs are mapped for uplink/downlink links. Specifically, if negotiation is not made through ML setup, if all TIDs are used for ML communication, and if the mapping between uplink/downlink link and TID is negotiated through additional ML settings, the negotiated TID may be used for ML communication.

Through ML setup, a plurality of links usable by the transmitting MLD and the receiving MLD related to ML communication may be set, and this may be referred to as an "enabled link". The "enabled link" may be called differently in various expressions. For example, it may be referred to as various expressions such as a first link, a second link, a transmission link, and a reception link.

After the ML setup is completed, the MLD could update the ML setup. For example, the MLD may transmit information on a new link when it is necessary to update information on the link. Information on the new link may be transmitted based on at least one of a management frame, a control frame, and a data frame.

According to an embodiment, the MLD may include a non-AP MLD and an AP-MLD. The non-AP MLD and the AP-MLD may be classified according to the function of an access point (AP). The non-AP MLD and the AP-MLD may be physically separated or logically separated. For example, when the MLD performs an AP function, it may be referred to as an AP MLD, and when the MLD performs a STA function, it may be referred to as a non-AP MLD.

In the following specification, MLD has one or more connected STAs and has one MAC service access point (SAP) that connects to an upper link layer (Logical Link Control, LLC). MLD may mean a physical device or a logical device. Hereinafter, a device may mean an MLD.

In addition, the MLD may include at least one STA connected to each link of the multi-link. For example, the processor of the MLD may control the at least one STA. For example, the at least one STA may be independently configured and operated. The at least one STA may include a processor and a transceiver, respectively. For example, the at least one STA may operate independently regardless of the processor of the MLD.

In the following specification, for the convenience of description, it is described that the MLD (or the processor of the MLD) controls at least one STA, but is not limited thereto. As described above, the at least one STA may transmit/receive a signal independently regardless of the MLD.

According to an embodiment, an AP MLD or a non-AP MLD may be configured in a structure having a plurality of links. In other words, the non-AP MLD may support a plurality of links. The non-AP MLD may include a plurality of STAs. A plurality of STAs may have a link for each STA.

In the EHT standard (802.11be standard), a Multi-Link Device (MLD) structure in which one AP/non-AP MLD supports multiple links is considered as a major technology. STAs included in the non-AP MLD may transmit information on other STAs in the non-AP MLD together through one link. Accordingly, there is an effect that the overhead of frame exchange is reduced. In addition, there is an effect of increasing the link usage efficiency of the STA and reducing power consumption.

FIG. 6 shows an example of the structure of a non-AP MLD.

Referring to FIG. 6, the non-AP MLD may have a structure having a plurality of links. In other words, the non-AP MLD may support a plurality of links. The non-AP MLD may include a plurality of STAs. A plurality of STAs may have a link for each STA. FIG. 6 shows an example of a structure of a non-AP MLD, but the structure of an AP MLD may be configured the same as an example of a structure of a non-AP MLD shown in FIG. 6.

For example, the non-AP MLD may include STA 1, STA 2, and STA 3. STA 1 may operate on link 1. Link 1 may be included in the 5 GHz band. STA 2 may operate on link 2. Link 2 may be included in the 6 GHz band. STA 3 may operate in link 3. Link 3 may be included in the 5 GHz band. The bands including link 1/2/3 may be an example, and they may be included in 2.4, 5, and 6 GHz.

As such, in the case of an AP/non-AP MLD supporting multi-link, each AP of the AP MLD and each STA of the non-AP MLD may be connected to each link through a link setup process. And at this time, the connected link may be changed or reconnected to another link by an AP MLD or a non-AP MLD depending on the situation.

In addition, in the EHT standard, in order to reduce power consumption, a link may be divided into an anchored link or a non-anchored link. The anchored link or the non-anchored link can be called variously. For example, the anchored link may be called a primary link. The non-anchored link may be called a secondary link.

According to an embodiment, the AP MLD supporting multi-link can be managed by designating each link as an anchored link or a non-anchored link. AP MLD may support one or more Links among a plurality of Links as the anchored link. The non-AP MLD can be used by selecting one or more of its own anchored links from the Anchored Link List (the list of anchored links supported by the AP MLD).

For example, the anchored link may be used for non-data frame exchange (i.e. Beacon and Management frame) as well as frame exchange for synchronization. Also, a non-anchored link can be used only for data frame exchange.

The non-AP MLD can perform monitoring (or monitor) only the anchored link to receive the Beacon and Management frame during the idle period. Therefore, in the case of a non-AP MLD, it must be connected to at least one anchored link to receive a beacon and a management frame. The one or more anchored links should always maintain the enabled state. In contrast, the non-anchored links can only be used for data frame exchange. Therefore, the STA corresponding to the non-anchored link (or the STA connected to the non-anchored link) may enter a doze during the idle period when the channel/link is not used. This has the effect of reducing power consumption.

When an AP MLD and a non-AP MLD are connected through multiple links through multi-link setup, 11be considers cross-link signaling, which transmits information about other links through one link.

Figure 7:
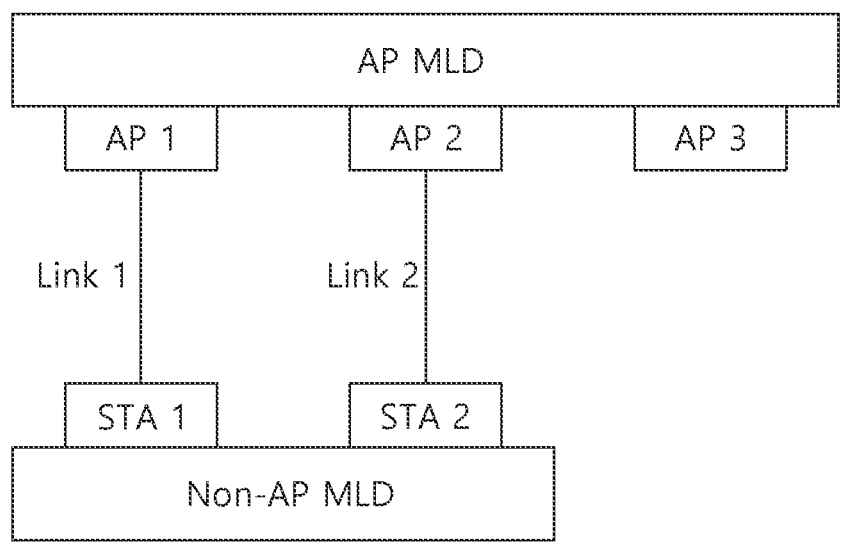
FIG. 7 is a diagram illustrating an embodiment of a link connection method between MLDs.

FIG. 7 is a diagram illustrating an embodiment of a link connection method between MLDs.

Referring to FIG. 7, the AP MLD may include AP1, AP2, and AP3, and the Non-AP MLD may include STA1 and STA2. AP1 and STA1 may be connected through link 1, and AP2 and STA2 may be connected through link 2. For example, when the AP MLD and the non-AP MLD are connected by two links as described above, AP1 may transfer information about AP2 to the non-AP MLD through Link 1.

This characteristic can be usefully used when the non-AP MLD is PS mode. In general, in order for the AP MLD to transfer information to STA2, Link 2 must be used, but it can be delivered to STA2 through Link 1 through cross-link signaling. However, for this purpose, information sharing capability capable of sharing information between STAs of non-AP MLD is required.

If STA2 of non-AP MLD is in the doze state of PS mode, if AP2 has information to be delivered to STA2, it does not wake STA2 through cross-link signaling. AP1 may transmit information to be delivered to STA2 to STA1 through Link 1.

In this specification, when there is changed information (e.g., critical update) among APs (i.e., BSSs) of the AP MLD, a method of notifying the connected non-AP STA of this information is proposed.

1. Announcement Method

In this specification, A method of notifying the connecting STA is proposed whenever critical information (e.g., critical update, BSS Parameters, Capabilities, Operation element, NSEP Priority Access, etc.) change or creation (e.g., low latency data traffic occurs) of the AP occurs.

In general, an STA can receive change information or new information from an AP through a periodically transmitted beacon frame, but in the case of specific information, since it may affect the transmission operation of the STA from the point of change, there may also be information that needs to be notified to the STA at the moment an event occurs. For example, non-Simultaneous TX/RX (non-STR) capability generated due to multi-link characteristics in 11be may cause restrictions on the TX/RX operation of the STA due to inter-link interference during data transmission, this information may be insufficient to convey through a beacon. In addition, in 11be, a change sequence field (or information indicating a change sequence number, such as a change sequence element) is included in a beacon or probe response frame, and through this, a method of notifying the STA of the presence or absence of specific information (for example, elements classified as critical update events in 11be) update for a specific AP (reporting AP or reported APs) as a number is defined. For example, when specific BSS parameter information is changed, the AP notifies the STA of the changed BSS information and the version information (i.e., number) of the changed information in the beacon as a change sequence field, Upon receiving the number, it is determined that the information has been updated, and information is received by transmitting a Probe request to the updated BSS. At this time, if the STA connected to the updated BSS is in Doze state, it may be awake through cross-signaling and then directly request the changed information.

The AP may notify the non-AP STA of whether BSS information is updated through the change sequence field. At this time, it is possible to inform which information has been updated through an indicator transmitted together.

First, when Link indication information (e.g., Link ID) is transmitted along with the change sequence field, the AP may also transmit BSS information update status of other APs within the same AP MLD. If the STA receiving the increased change sequence field value from the AP through the Beacon frame (or other frame) receives the Link ID together with the change sequence field, it can know which AP of the connected AP MLD has updated BSS information. That is, the STA can know that the BSS information has been updated based on the increase in the change sequence field value, and can know which BSS information has been updated through the Link ID.

Second, when element indication information (e.g., element ID) is transmitted together with the change sequence field, the AP may inform the non-AP MLD which information has been updated. If the STA receiving the increased Change sequence field value through a Beacon frame (or other frame, for example, (Broadcast) Probe response frame, etc.) from the AP receives the Element ID together with the Change sequence field, any information of the connected AP to see if it has been updated. For example, the AP may indicate specific information using a Request element, an Extended element, or a PV1 Probe Response Option element. At this time, if the AP transmits not only element indication information but also link indication information together with the change sequence field, the STA may know which information of which BSS of the connected AP MLD has been updated. This information can be useful because it is possible to know the presence or absence of changed information without service disruption when some links of the AP MLD undergo power saving. In particular, in the case of an STA of a non-AP MLD entering power saving, when it knows that it has updated BSS information through information received by another STA (i.e., an STA in an Awake state) of the same non-AP MLD, it unconditionally Instead of Awake, depending on the situation (according to the importance of information), you can choose whether or not to Awake. At this time, when the AP MLD transmits all critical update IEs (e.g., all IE information classified as critical update events in 11be) along with link information of a specific AP and Change Sequence field information of the corresponding AP, the AP may inform which AP has generated the critical update. An STA that receives a Change Sequence field value that is increased compared to its current CSN information through a Beacon frame (or other frame, for example, (Broadcast) Probe response frame, etc.) from the AP may receive all the latest Critical update les from the corresponding AP regardless of its current CSN value. Therefore, the above method can be useful for long sleep devices.

Therefore, in this specification, an announcement method is proposed for an AP to notify when an update of its own critical information occurs or when critical information occurs. Signaling for this may deliver changed information through a separate announcement frame, or may be delivered by piggybacking to a DL frame of the AP. At this time, a separate announcement frame may be a management frame (e.g., broadcast probe response, etc.) or a separate new frame may be defined for this. In this specification, both a method considering a device with a single link and a device with multi-link are considered for the announcement method. Section 1-1 proposes an explicit method that directly delivers changed information, and Section 1-2 proposes an implicit method that indirectly delivers changed information through indication. Additionally, Section 2 proposes an announcement method considering power saving.

1-1. Explicit Method for Announcement

In this section, when the BSS information of the AP MLD is changed (e.g., critical update occurs), a method of directly notifying the STA of the changed information is proposed. The STA that has acquired the changed information through this method can obtain the changed information from the AP without a separate additional operation. Also, this method can be used for notifying low latency STAs that low latency traffic has occurred.

First, when the AP MLD is connected to a non-AP MLD or legacy STA with a single link, when the BSS information of the AP is changed, a method of notifying the STA of this is proposed.

If a critical update occurs in the AP, the changed information is included in a separate announcement frame (e.g., a new definition frame or a broadcast probe response, etc.) and transmitted to the connected STA. An example for this is as follows.

Figure 8:
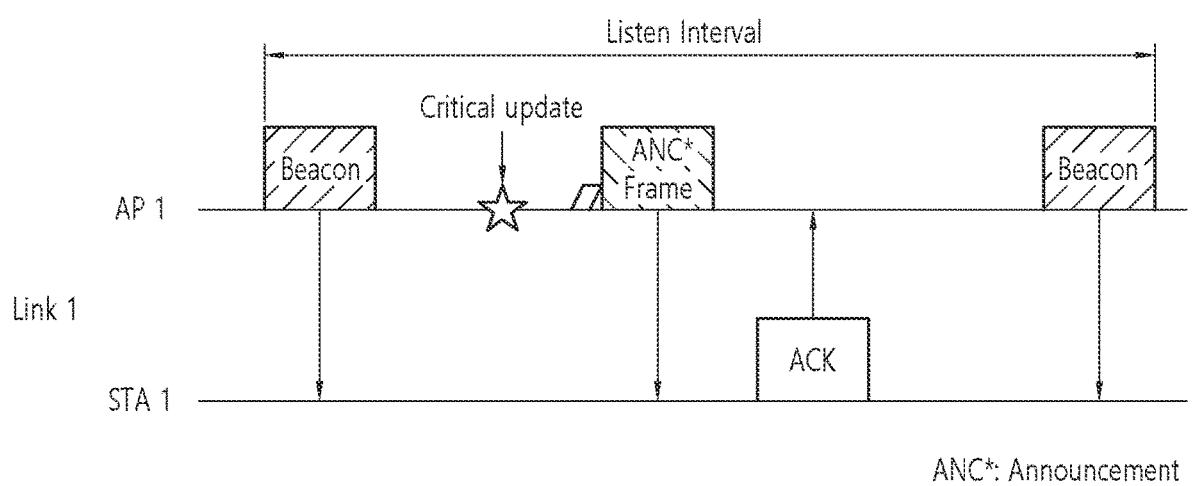
FIG. 8 is a diagram showing an embodiment of an announcement explicit method considering a single link device.

FIG. 8 is a diagram showing an embodiment of an announcement explicit method considering a single link device.

Referring to FIG. 8, when a channel switch occurs in the BSS of AP1 (i.e., critical update), the AP MLD may notify the STA of a change thereto through an announcement frame.

An embodiment of the case of using a probe response frame as an announcement frame for this is as follows.

FIG. 9 is a diagram illustrating an embodiment of a frame format when using a probe response frame as an announcement frame.

Referring to FIG. 9, when a channel switch occurs (i.e., critical update) in the BSS of a reporting AP, corresponding information may be announced through a (broadcast) probe response. The probe response frame may include change sequence number (CSN) information indicating that a critical update has occurred (e.g., change sequence element) and changed parameter information (e.g., channel switch announcement). For example, the announcement frame may include only IE information changed as the CSN of the AP is updated from 4 to 5.

The AP may notify only changed information through an announcement frame when a critical update occurs, but because STAs receiving it may have different CSN information for various reasons (e.g., long sleep device, etc.), all IE information related to critical update may be provided. For example, if the current CSN information of AP1 is 5, STA1 currently has CSN=4 information for AP1, but STA2 in long sleep may have CSN=2 information for AP1. Considering this, the AP may notify changed information through an announcement frame when a critical update event occurs. At this time, a frame including all IE information classified as a critical update event may be transmitted. At this time, all IE information classified as a critical update event may mean information defined in 11be. Currently, 11be defines it as "The critical updates are defined in 11.2.3.15 (TIM Broadcast) and the additional update can be added if needed." In this way, when a critical update event occurs, the AP transmits an announcement frame (e.g., (Broadcast) Probe Response frame) including all critical update IEs defined in 11be to provide the STA with the most recent critical update information of the AP.

An embodiment of the case of using a Probe response frame as an announcement frame (Broadcast) is as follows.

Figure 10:
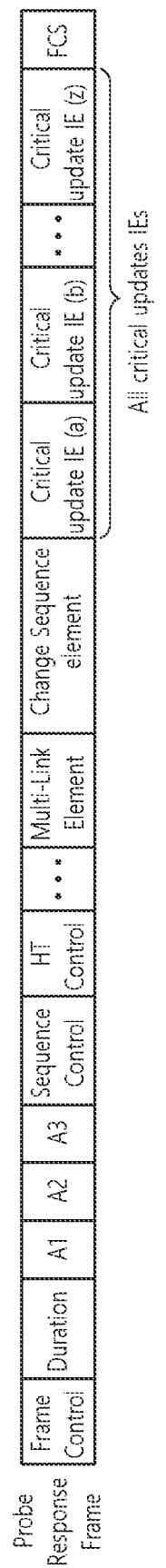
FIG. 10 is a diagram illustrating an embodiment of a frame format when using a probe response frame as an announcement frame.

FIG. 10 is a diagram illustrating an embodiment of a frame format when using a probe response frame as an announcement frame.

Referring to FIG. 10, for example, when a critical update event occurs in the BSS of a reporting AP, corresponding information may be announced through a (broadcast) probe response. In this case, the corresponding probe response frame may include CSN information indicating that a critical update has occurred through the above format (e.g., Change Sequence element) and information classified into all critical update events (e.g., all critical update IE information). That is, the announcement frame may include all IE information related to the critical update (e.g., critical update IE(a), . . . , critical update IE(z)) When AP's CSN is updated from 4 to 5.

In addition, this method can also be used as a method of notifying the low latency STA when low latency data traffic occurs in the AP. For example, when data traffic for low latency STAs occurs in a specific AP, the AP MLD may inform the low latency STAs of the corresponding information in a separate announcement frame. The low latency STA receiving the corresponding announcement frame may maintain the awake state without entering the doze state for information reception.

In addition, information related to the critical update may be piggybacked in a DL frame being transmitted instead of a separate announcement frame and transmitted to the STA. If there is a DL frame to be transmitted by the AP after a critical update occurs, information related to the APSMS critical update may be included in the DL frame and transmitted. An example for this is as follows.

Figure 11:
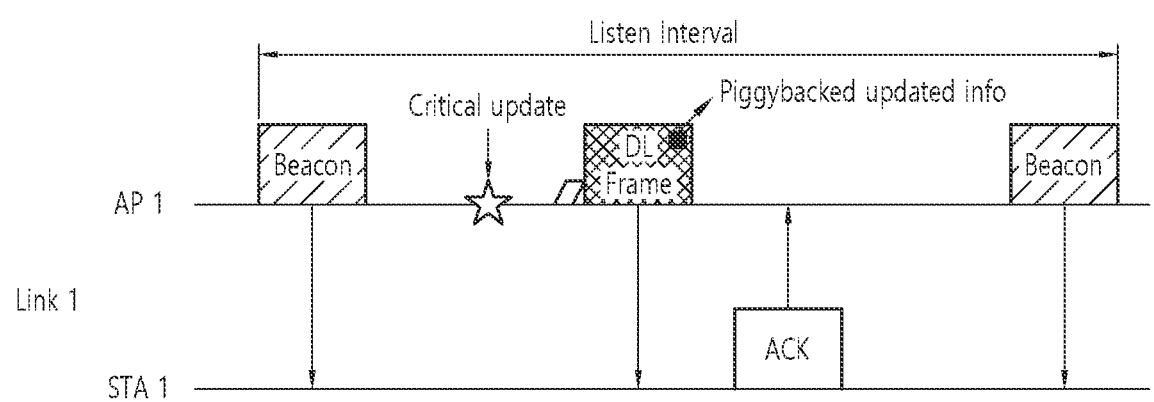
FIG. 11 is a diagram showing an embodiment of an announcement explicit method considering a single link device.

FIG. 11 is a diagram showing an embodiment of an announcement explicit method considering a single link device.

Referring to FIG. 11, when an operation element change occurs in the BSS of AP1, if there is a DL frame to be transmitted from AP1 to the STA before transmitting the next beacon, updated information may be included in the DL frame and transmitted. If there is a DL frame to be transmitted by AP1, frame overhead can be reduced by not using a separate announcement frame through this method.

Even in this case, when a critical update occurs in the AP, the AP may transmit a DL Frame including all critical update IE information classified as a critical update event, not only changed information. An example for this is as follows.

Figure 12:
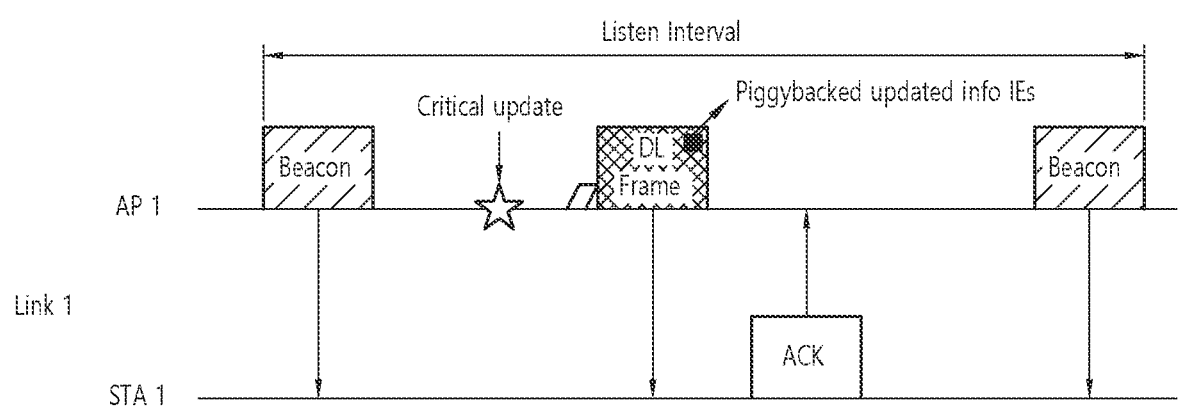
FIG. 12 is a diagram showing an embodiment of an announcement explicit method considering a single link device.

FIG. 12 is a diagram showing an embodiment of an announcement explicit method considering a single link device.

Referring to FIG. 12, when an operation element change occurs in the BSS of AP1 (i.e., critical update), when there is a DL frame to be transmitted from AP1 to the STA before the next beacon transmission, the AP MLD may include and transmit all critical update information for AP1 in a DL frame. If there is a DL frame to be transmitted by AP1, frame overhead can be reduced by not using a separate announcement frame through this method.

In addition, if critical information (e.g., low latency data traffic) occurs in the AP, the AP may transmit the corresponding information to the STA through a DL frame. At this time, this DL Frame may be a Data Frame or a TWT Frame. For example, when low latency data traffic occurs in an AP, the AP may piggyback information related to low latency data traffic generation to a DL Frame or generate a separate DL Frame (e.g., TWT Frame) to deliver the relevant critical information to the STA.

Second, when the AP MLD is connected to a non-AP MLD with multi-link, when the BSS information of the AP is changed, a method of notifying the STA of this is proposed. 11be considers cross-link signaling by utilizing the characteristics of multi-link. Accordingly, through cross-link signaling, an AP MLD can inform a non-AP MLD of BSS information of other APs as well as its own BSS change information through its own link. An example of this is given below.

Figure 13:
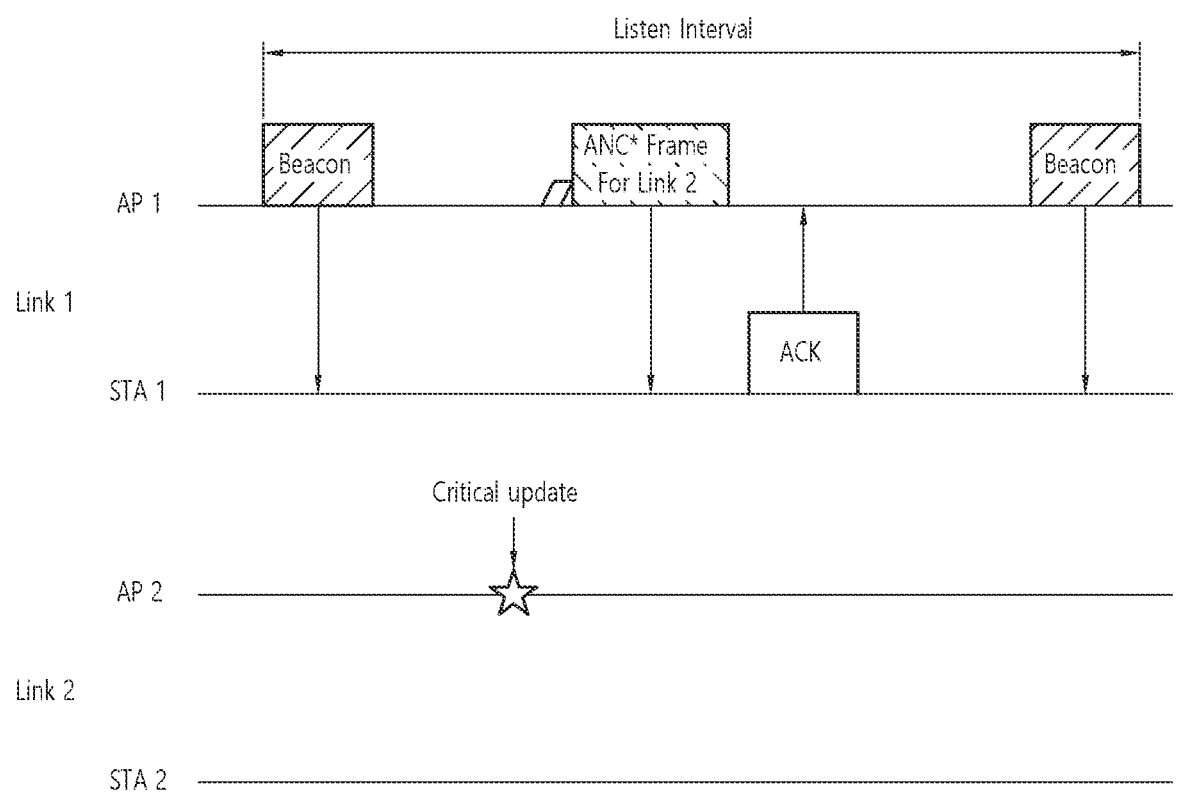
FIG. 13 is a diagram showing an embodiment of an announcement explicit method considering a multi-link device.

FIG. 13 is a diagram showing an embodiment of an announcement explicit method considering a multi-link device.

Referring to FIG. 13, when BSS information of AP2 is changed, the AP MLD may notify STA2 of this by transmitting an announcement frame through Link 1 instead of Link 2. Upon receiving the announcement frame through Link 1, STA1 may deliver change information to STA2 through information sharing. In this cross-link signaling method, when STA2 is in Doze state for power saving, information related to critical update can be transmitted through Link 1 without awake to receive changes (i.e., information related to critical update). Therefore, it can be more usefully used for STAs operating in PS mode. An example of this is given below.

Figure 14:
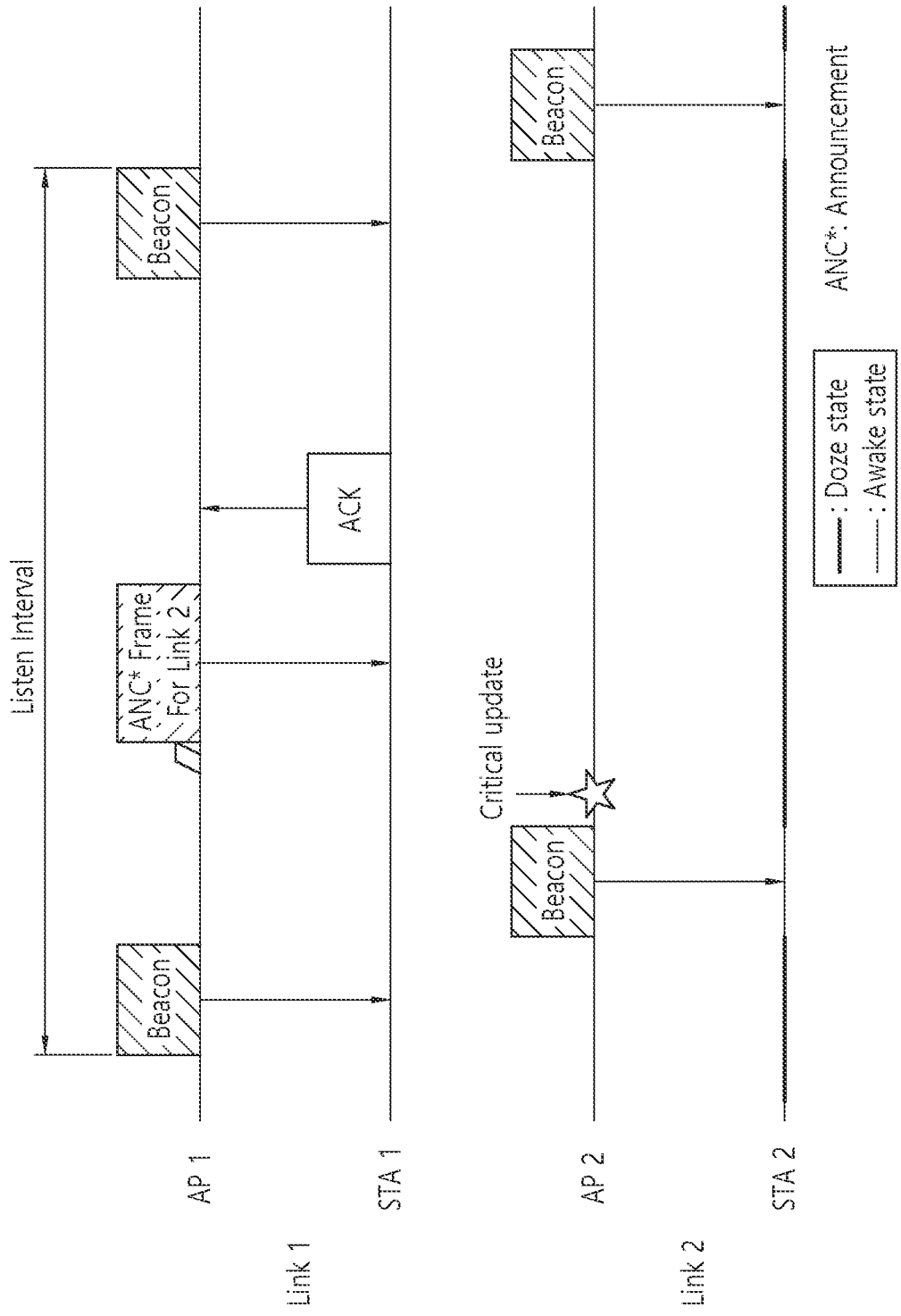
FIG. 14 is a diagram illustrating an embodiment of an operating method of an STA operating in PS mode.

FIG. 14 is a diagram illustrating an embodiment of an operating method of an STA operating in PS mode.

Referring to FIG. 14, if the proposed method is used when STA2 operates in PS mode as described above, even if a critical update occurs in AP2, STA2 can acquire change information of AP2 without awakening. Utilizing this, STA2 can further reduce power consumption.

That is, STA2 may operate in PS mode and be in a doze state. For example, STA2 may receive a beacon frame by transitioning to an awake state only when receiving a beacon frame. After STA2 receives the beacon frame, when a critical update occurs in AP2, the STA cannot acquire information related to the critical update of AP2 until the next beacon frame is received in the existing case. However, in this embodiment, AP1 may transmit information related to the critical update of AP2 to STA1 through an announcement frame. STA1 may deliver information related to the critical update of AP2 to STA2 through cross-link signaling. Accordingly, STA2 can acquire information related to the critical update generated in AP2 even before receiving the next beacon frame.

An embodiment of the case of using a probe response frame as an announcement frame for this is as follows.

Figure 15:
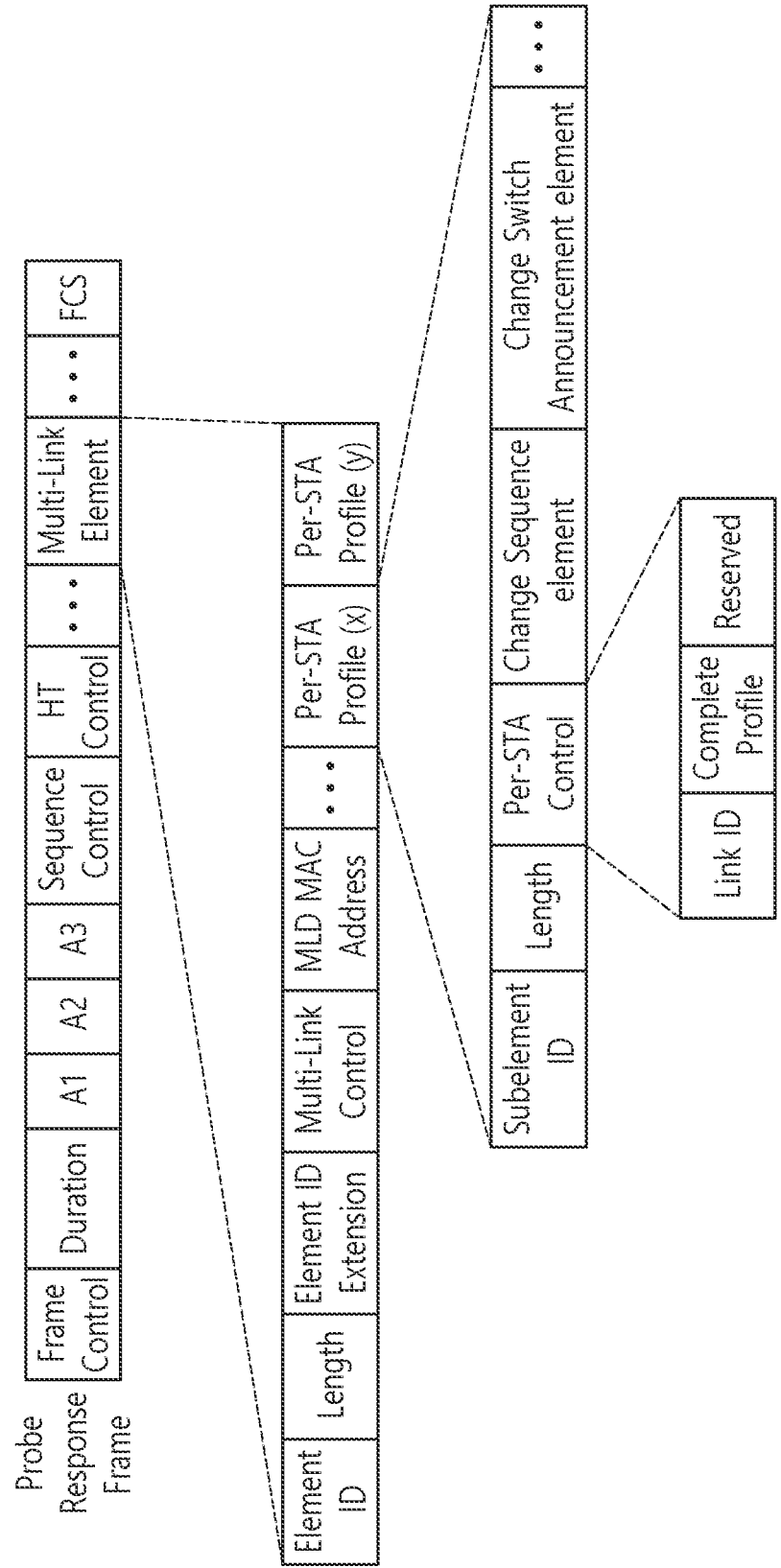
FIGS. 15 to 17 are diagrams illustrating an embodiment of a frame format when a probe response frame is used as an announcement frame.

FIG. 15 is a diagram illustrating an embodiment of a frame format when a probe response frame is used as an announcement frame.

Referring to FIG. 15, when a channel switch occurs in the BSS of AP(x) (i.e., critical update), corresponding information may be announced through a (broadcast) probe response. In this case, the corresponding probe response frame includes CSN information indicating that a critical update has occurred (e.g., change sequence element) and changed parameter information (e.g., channel switch announcement) through the form shown in FIG. 15. Information can be informed through the Multi-Link element of the probe response. In the case of a non-AP MLD operating in power save mode, since the corresponding Multi-Link element includes information about a reported AP (i.e., other AP) rather than information about a reporting AP, the STA may acquire change information that another STA in the doze state needs to know through the corresponding announcement frame. In addition, all critical update information (e.g., all IE information classified as a critical update event in 11be) along with CSN information indicating that a critical update has occurred for another AP may be included in the frame and notified through the corresponding probe response frame. For example, it is assumed that AP1 and AP2 of the AP MLD and STA1 and STA2 of the non-AP MLD are connected through Link 1 and Link 2, and STA2 enters the doze state due to power saving. At this time, when a critical update occurs in AP2, it should notify STA2, but since STA2 is in a doze state, STA2 must be awakened to notify it. At this time, the AP MLD provides information (broadcast) on the critical update of AP2 through a probe response frame through Link 1, so that the non-AP MLD can obtain updated information without waking STA2. Considering the multi-link characteristics of the AP MLD, the STA of the non-AP MLD can obtain critical update information about other APs through its own operating link, which can be useful for power saving. At this time, in particular, when a critical update event for AP2 occurs, AP1 can notify the changed information on AP2 through an announcement frame. At this time, a frame containing all IE information classified as a critical update event for AP2 may be transmitted. At this time, all IE information classified as a critical update event means information defined in 11be. Currently, in 11be, it is defined as "The critical updates are defined in 11.2.3.15 (TIM Broadcast) and the additional update can be added if needed." In this way, the AP MLD utilizes the multi-link feature and even when a critical update event occurs for another AP of the same AP MLD, an announcement frame including all critical update IEs defined in 11be through cross-link signaling (e.g., (Broadcast) Probe Response frame) may be provided to the STA with the latest critical update information of the AP.

An embodiment of the case of using a Probe response frame as an announcement frame (Broadcast) is as follows.

Figure 16:
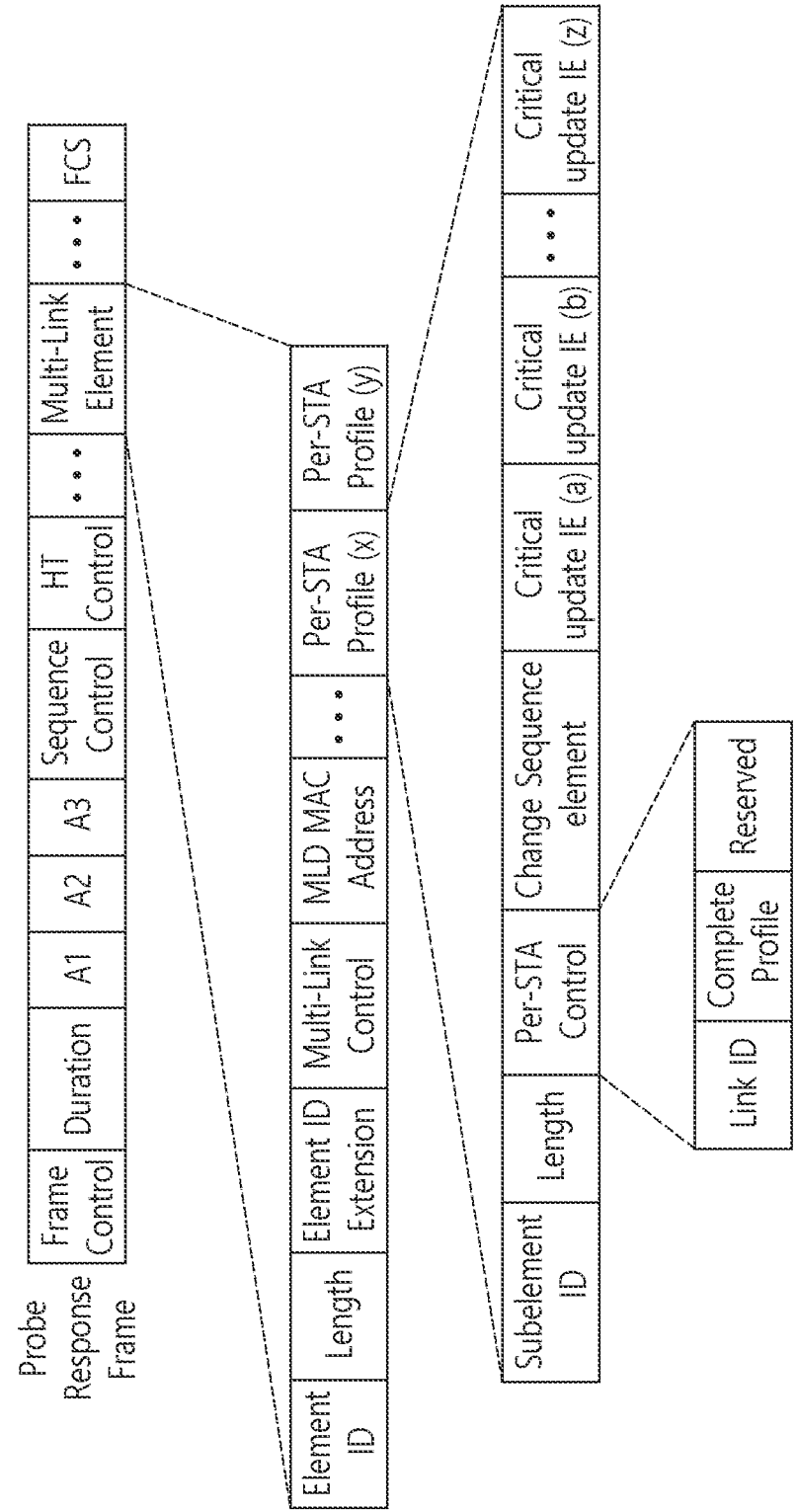

FIG. 16 is a diagram illustrating an embodiment of a frame format when a probe response frame is used as an announcement frame.

Referring to FIG. 16, when a channel switch occurs in the BSS of AP(x) (i.e., critical update), corresponding information may be announced through a (broadcast) probe response. In this case, the corresponding probe response frame includes CSN information indicating that a critical update has occurred through the above format (e.g., change sequence element) and all critical update information (e.g., all IEs classified as critical update events in 11be) Information, Critical update IE (a), . . . , Critical update IE (z)) can be informed through the Multi-Link element of the probe response. Since the corresponding Multi-Link element contains information about the reported AP (i.e., other AP) rather than information about the reporting AP, in the case of a non-AP MLD operating in power save mode, an STA may acquire change information that another STA in doze state needs to know through a corresponding announcement frame. At this time, information about the reported AP may be included in Per-STA Profile (x) including a Link ID field corresponding to the reported AP.

This method may be used in combination with the change information delivery method for the reporting AP mentioned above. An example of using the frame format of the probe response frame in this case is as follows. Through this form, the reporting AP can deliver important change information about itself and change information about the reported AP according to circumstances.

Figure 17:
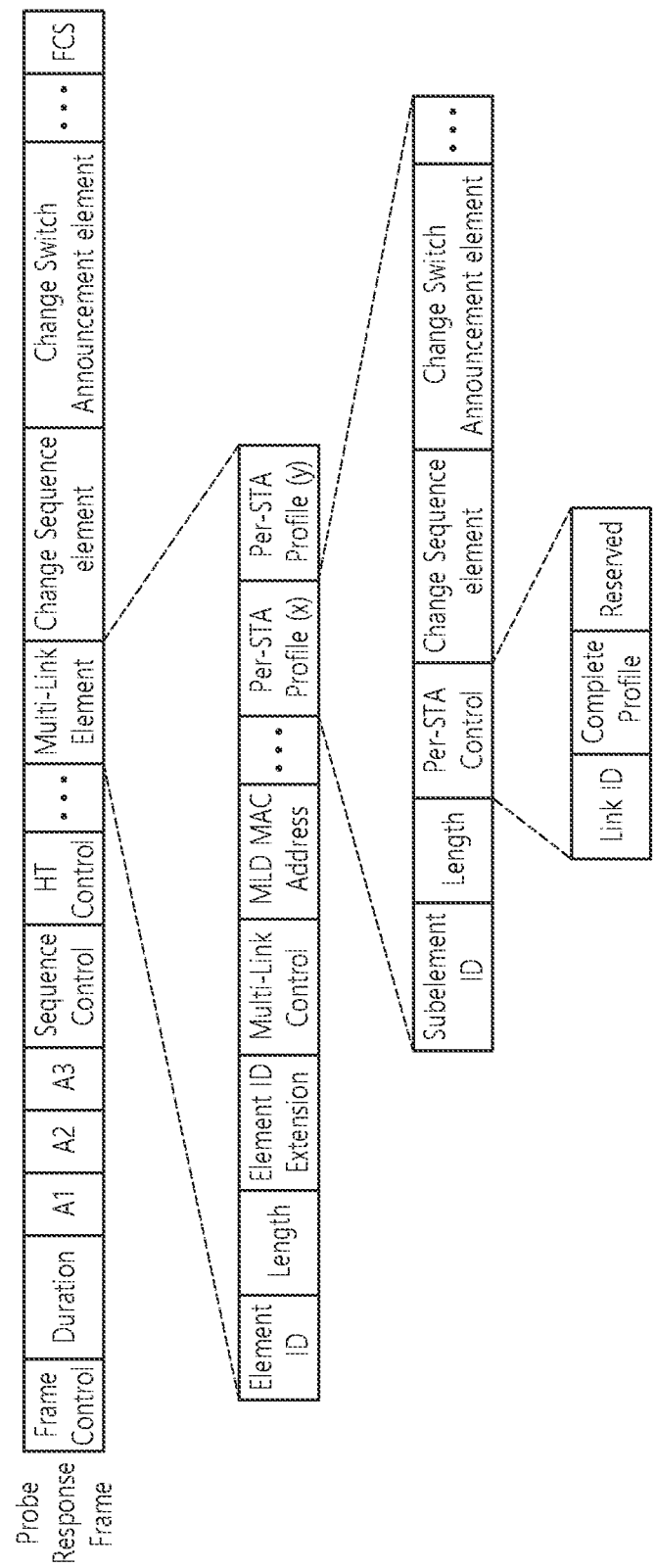

FIG. 17 is a diagram illustrating an embodiment of a frame format when a probe response frame is used as an announcement frame.

Referring to FIG. 17, when low latency data traffic occurs in a specific AP of an AP MLD, it can be notified to low latency STAs. 11be considers cross-link signaling by utilizing the characteristics of multi-link. Accordingly, through cross-link signaling, the AP MLD can notify Low latency data traffic information generated in its own AP as well as Low latency data traffic information generated in other APs to Low latency STAs through its own link. When the STA receiving the announcement frame checks whether or not there is low latency traffic for other STAs of the non-AP MLD to which it is connected, the other STA is in doze state to receive information, awake in doze state, or in awake state, The STA may maintain the awake state without entering the doze state.

In addition, such changes may be notified to the STA by piggybacking them to a DL frame being transmitted instead of a separate announcement. An example for this is as follows.

Figure 18:
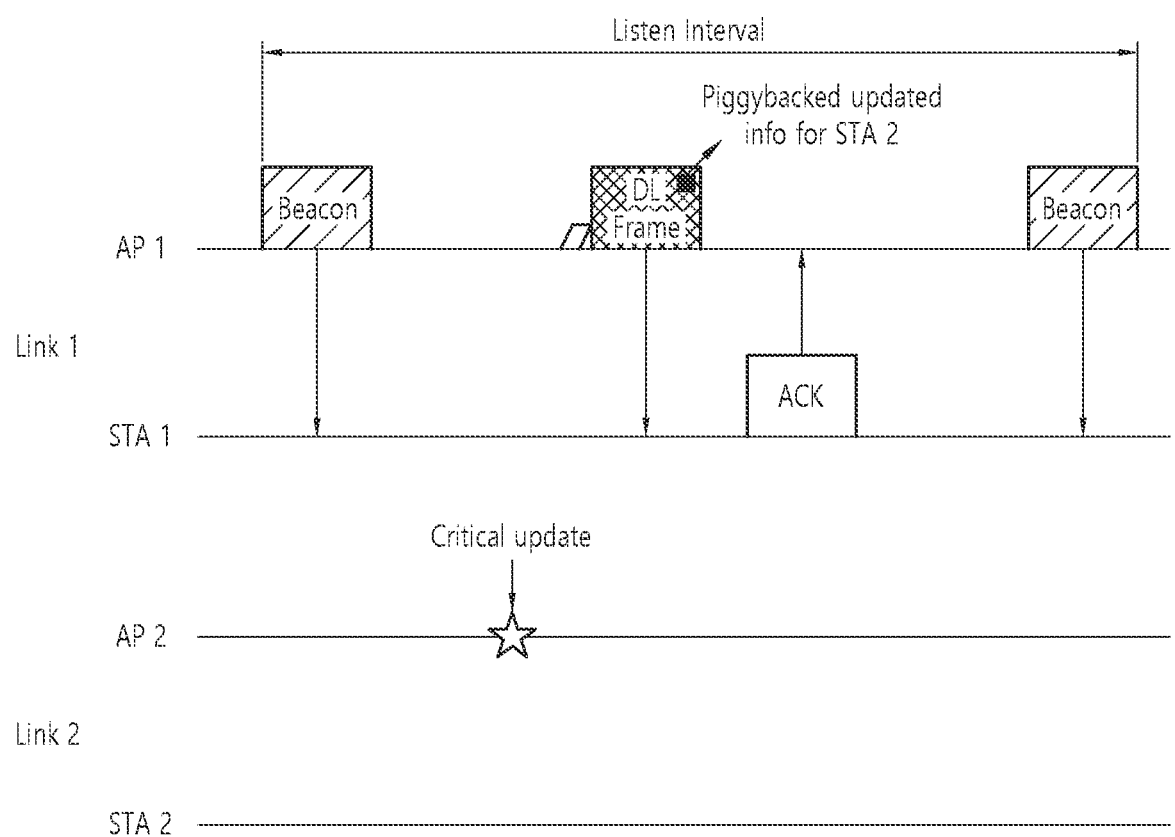
FIG. 18 is a diagram showing an embodiment of an announcement explicit method considering a multi-link device.

FIG. 18 is a diagram showing an embodiment of an announcement explicit method considering a multi-link device.

Referring to FIG. 18, when a critical update occurs in AP2, if there is a DL frame to be transmitted in AP1, changes in AP2 may be included in the DL frame to be transmitted and delivered to STA2. If there is a DL frame to be transmitted by AP1, frame overhead can be reduced by not using a separate announcement frame through this method. In addition, when STA2 enters Doze state through PS mode, it can be used more usefully because change information can be transmitted through Link 1 without awakening. An example of this is given below.

Figure 19:
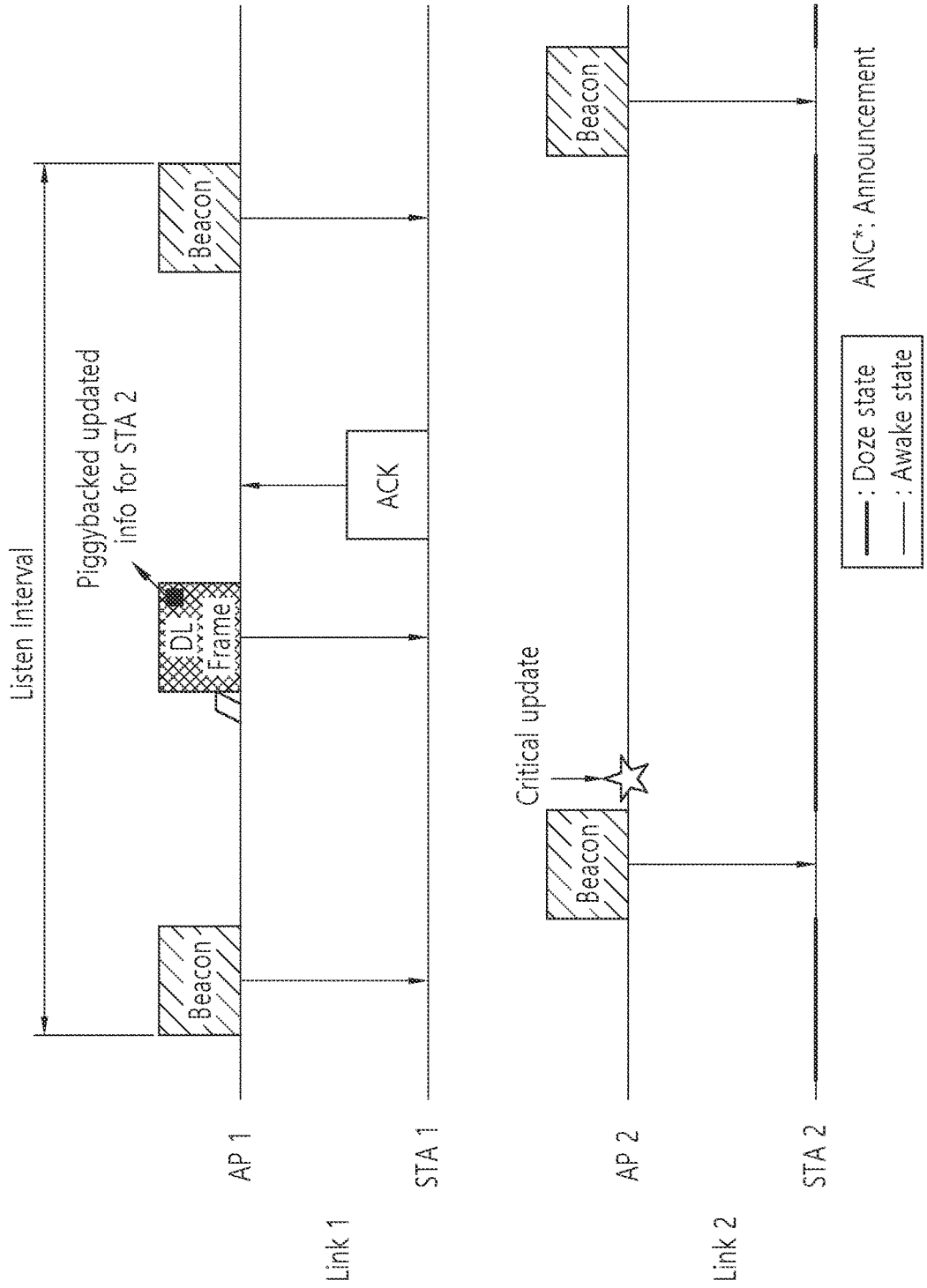
FIG. 19 is a diagram illustrating an embodiment of an operation method of an STA operating in PS mode.

FIG. 19 is a diagram illustrating an embodiment of an operation method of an STA operating in PS mode.

Referring to FIG. 19, if the proposed method is used when STA2 operates in PS mode as described above, even if a critical update occurs in AP2, STA2 can acquire change information of AP2 without awakening. Utilizing this, STA2 can further reduce power consumption.

Even in this case, when a critical update occurs in the AP, a DL Frame including all critical update IE information classified as a critical update event, not only changed information, can be transmitted. An example for this is as follows.

Figure 20:
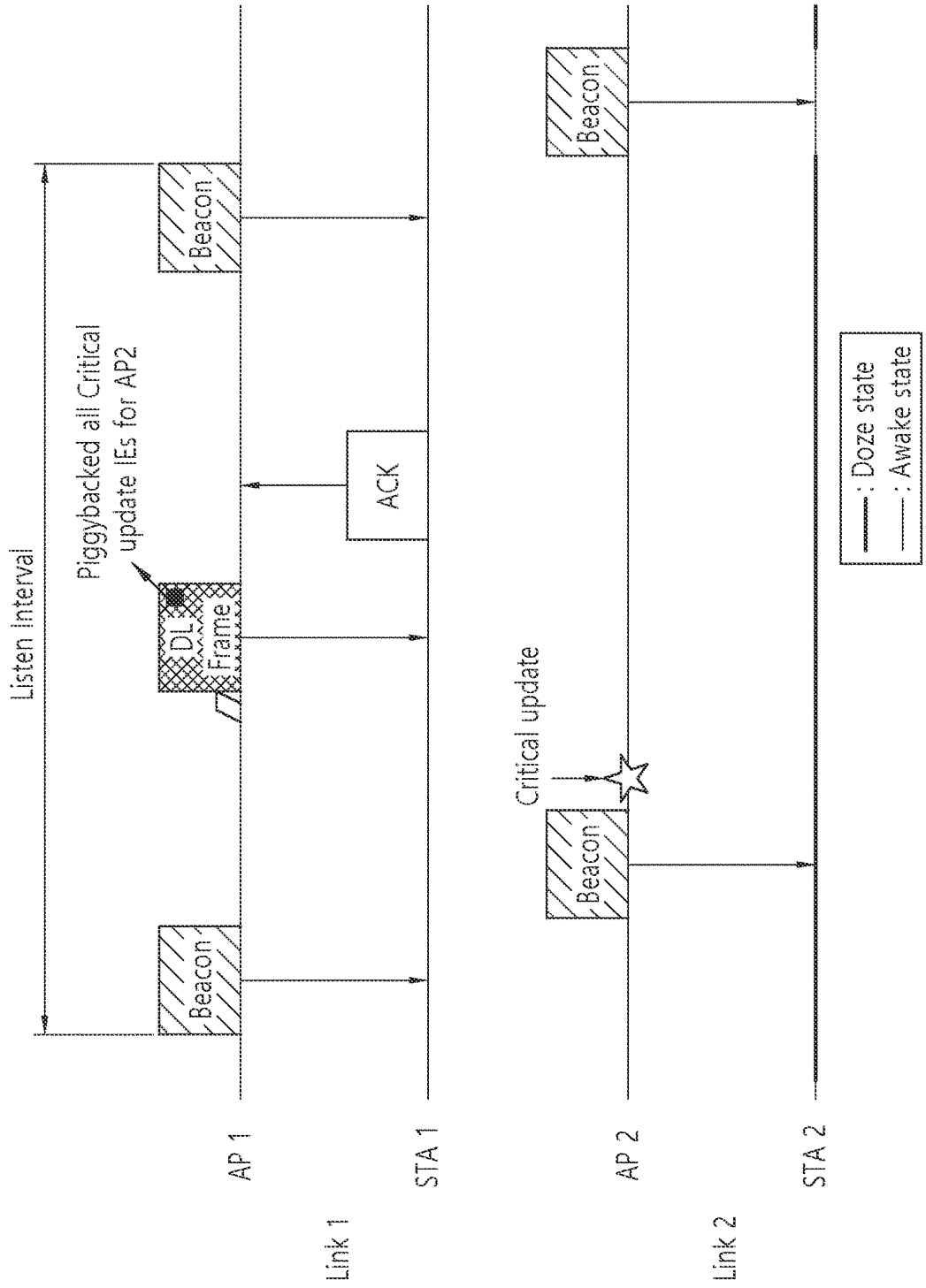
FIG. 20 is a diagram showing an embodiment of an announcement explicit method considering a multi-link device.

FIG. 20 is a diagram showing an embodiment of an announcement explicit method considering a multi-link device.

Referring to FIG. 20, when an operation element change occurs in the BSS of AP2 (i.e., critical update), if there is a DL frame to be transmitted from AP1 to the STA before the next beacon transmission, all critical update information for AP2 may be included in the DL frame and transmitted. If there is a DL frame to be transmitted by AP1, frame overhead can be reduced by not using a separate announcement frame through this method, and it is useful for power saving because it can deliver changed information without waking STA2.

In addition, if critical information (e.g., low latency data traffic) occurs in a specific AP of the AP MLD, the AP may transmit the corresponding information to the STA through a DL frame. At this time, this DL Frame may be a data frame to be transmitted or a TWT Frame. For example, if low latency data traffic occurs in a specific AP, if there is a DL Frame to be transmitted through the other AP, the critical information may be transmitted to the STA by piggybacking the DL Frame or generating a separate DL Frame (e.g., TWT Frame). Utilizing the cross link signaling characteristics of multi-link, it is efficient for throughput or power saving because the STA that needs to receive the corresponding critical information does not need to wake in the doze state or perform a separate additional channel access.

1-2. Implicit Method for Announcement

In this section, when the BSS information of the AP MLD is changed or critical information is generated, a method of indirectly notifying the STA of the changed (generated) corresponding information is proposed. Through this method, the STA confirming that there is currently changed BSS information or generated critical information can acquire the changed information from the AP by requesting desired information from the AP.

First, when the AP MLD is connected to a non-AP MLD or legacy STA with a single link, when the BSS information of the AP is changed, a method of notifying the STA of this is proposed.

If a critical update occurs in the AP, an indication indicating that there is changed information (e.g., change sequence field, change sequence element, etc.) in a separate announcement frame (e.g., new definition frame or broadcast probe response, etc.) and transmits it to the connected STA. An example for this is as follows.

Figure 21:
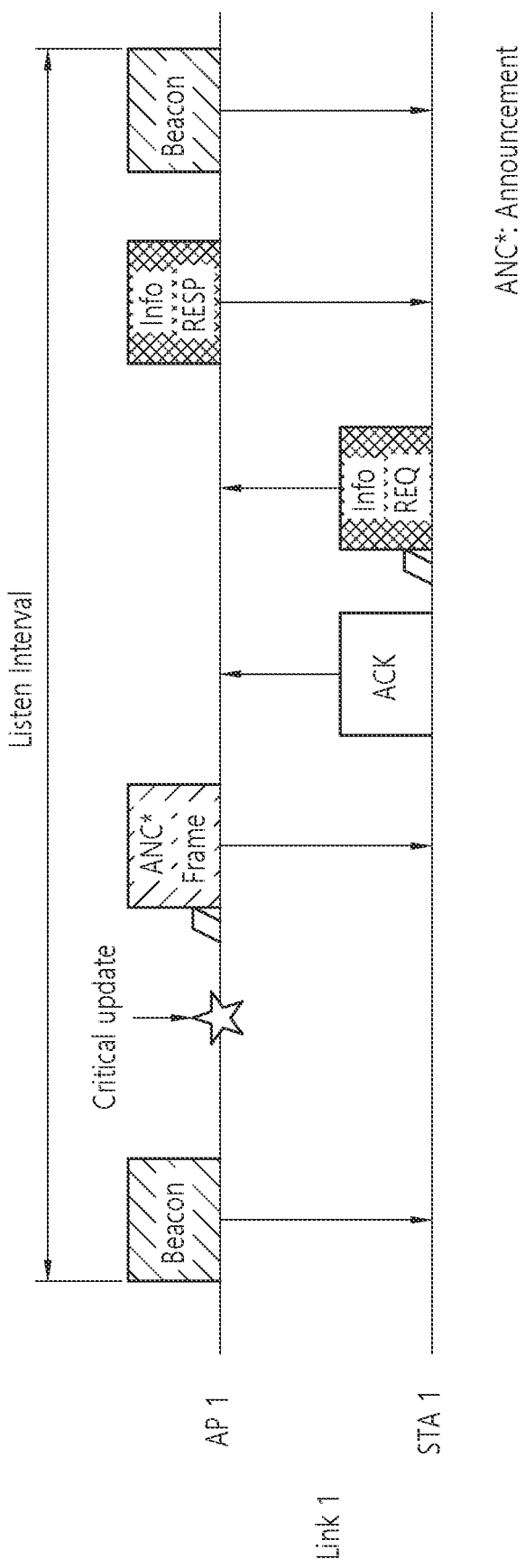
FIG. 21 is a diagram illustrating an embodiment of an announcement implicit method considering a single link device.

FIG. 21 is a diagram illustrating an embodiment of an announcement implicit method considering a single link device.

Referring to FIG. 21, when a critical update occurs in AP1, AP1 may inform STA1 of such change presence/absence information in an announcement frame. At this time, the information included in the announcement frame includes only whether or not specific information has been updated, not actual field values. Upon receiving this, STA1 may request the changed information through Link 1. At this time, the Request frame requested by STA1 may be a separately defined frame, management frame (e.g., probe request) or QoS data frame. Alternatively, STA1 may attempt to listen to the next beacon to receive important change information.

An embodiment of the case of using a probe response frame as an announcement frame for this is as follows.

Figure 22:
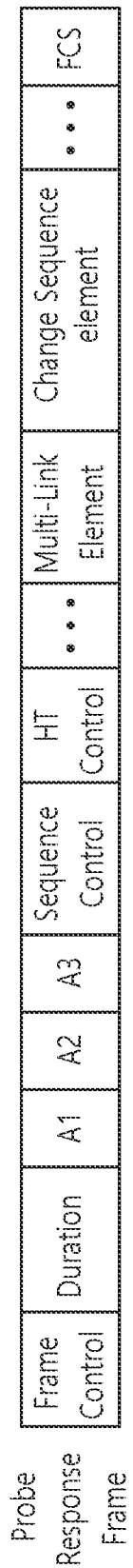
FIG. 22 is a diagram illustrating an embodiment of a frame format when using a probe response frame as an announcement frame.

FIG. 22 is a diagram illustrating an embodiment of a frame format when using a probe response frame as an announcement frame.

Referring to FIG. 22, when a critical update occurs in the BSS of a reporting AP, corresponding information may be announced through a (broadcast) probe response. In this case, the corresponding probe response frame may inform the probe response by including CSN information (e.g., change sequence element, change sequence field) indicating that a critical update has occurred through the above format. The STA receiving the message compares the CSN information it currently has (in 11be, non-AP STAs agreed to maintain the most recently received CSN information) and the CSN information received through the announcement frame. Therefore, it can be known that critical update has occurred for the current reporting AP. Thereafter, the STA may transmit a probe request frame to acquire critical update change information or may attempt to receive the next Beacon. At this time, when the STA transmits a (MLD) Probe request frame to acquire critical update change information, the AP receiving it may respond with a (MLD) Probe response frame including information changed due to the critical update, In order to provide information about this to all STAs (Broadcast), it may be broadcast in a Probe Response frame. In this case, information included in the response frame may be information changed due to the most recent critical update information (That is, when the CSN value of the AP is 5, information changed as CSN 4 is updated to CSN 5) or all critical update information (That is, all information classified as a critical update event in 11be).

STA1 may request information from AP1 for all or some information after checking which information obtained through the announcement frame has changed. For example, when it is confirmed that various information on the BSS has been changed through the announcement frame, the STA may request only information corresponding to the critical update. At this time, if the STA wants to request only specific information, the Request IE/Extended Request IE or PV1 Probe Response Option element may be reused or extended, or a separate bitmap may be defined to indicate information that the STA wants to request.

In addition, the indication for such a change may be piggybacked to a DL frame being transmitted instead of a separate announcement to notify the STA. If there is a DL frame to be transmitted by the AP after a critical update occurs, the AP may include the indication in the DL frame and transmit it. An example for this is as follows.

Figure 23:
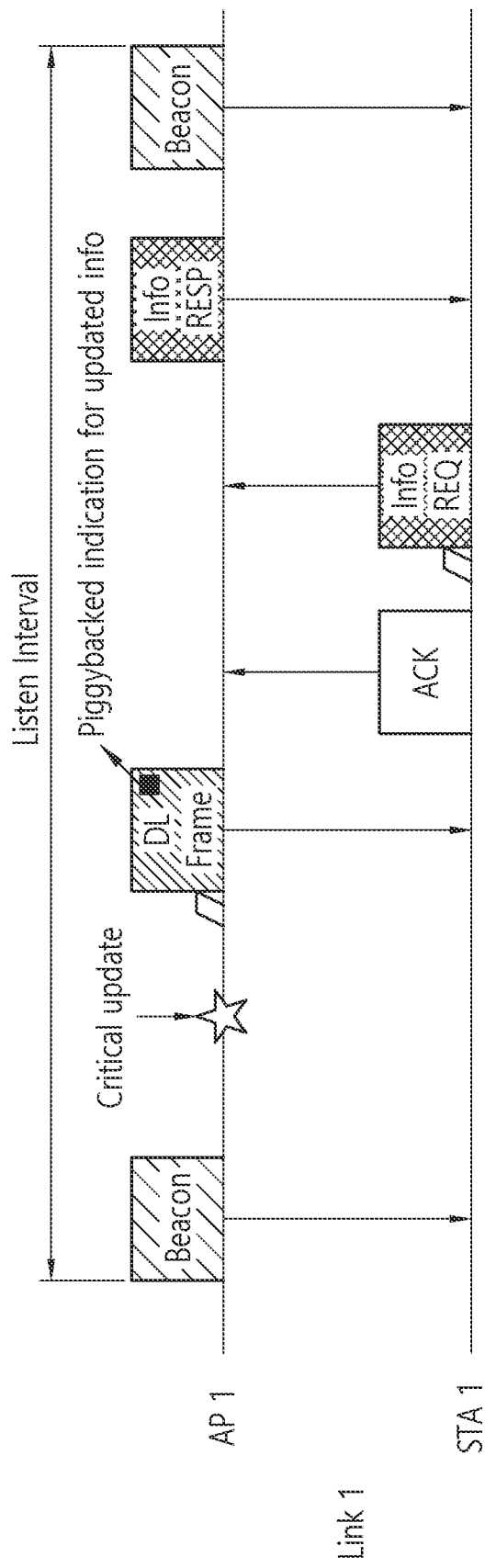
FIG. 23 is a diagram illustrating an embodiment of an announcement implicit method considering a single link device.

FIG. 23 is a diagram illustrating an embodiment of an announcement implicit method considering a single link device.

Referring to FIG. 23, when an operation element change occurs in the BSS of AP1, if there is a DL frame to be transmitted from AP1 to the STA before the next beacon transmission, an indication indicating updated information may be included in the DL frame and transmitted. If there is a DL frame to be transmitted by AP1, frame overhead can be reduced by not using a separate announcement frame through this method. Upon receiving this, STA1 may indicate the information it wants to acquire and request the corresponding information from AP1 through a request frame. Upon receiving this request frame, the AP transmits information in a response frame. At this time, STA1 may request all of the changed information or only some of the information.

Second, when the AP MLD is connected to a non-AP MLD with multi-link, when the BSS information of the AP is changed, a method of notifying the STA of this is proposed. 11be considers cross-link signaling by utilizing the characteristics of multi-link. Accordingly, through cross-link signaling, the AP MLD can inform the non-AP MLD of BSS information of other APs as well as an indication of its own BSS change information through its own link. An example of this is given below.

Figure 24:
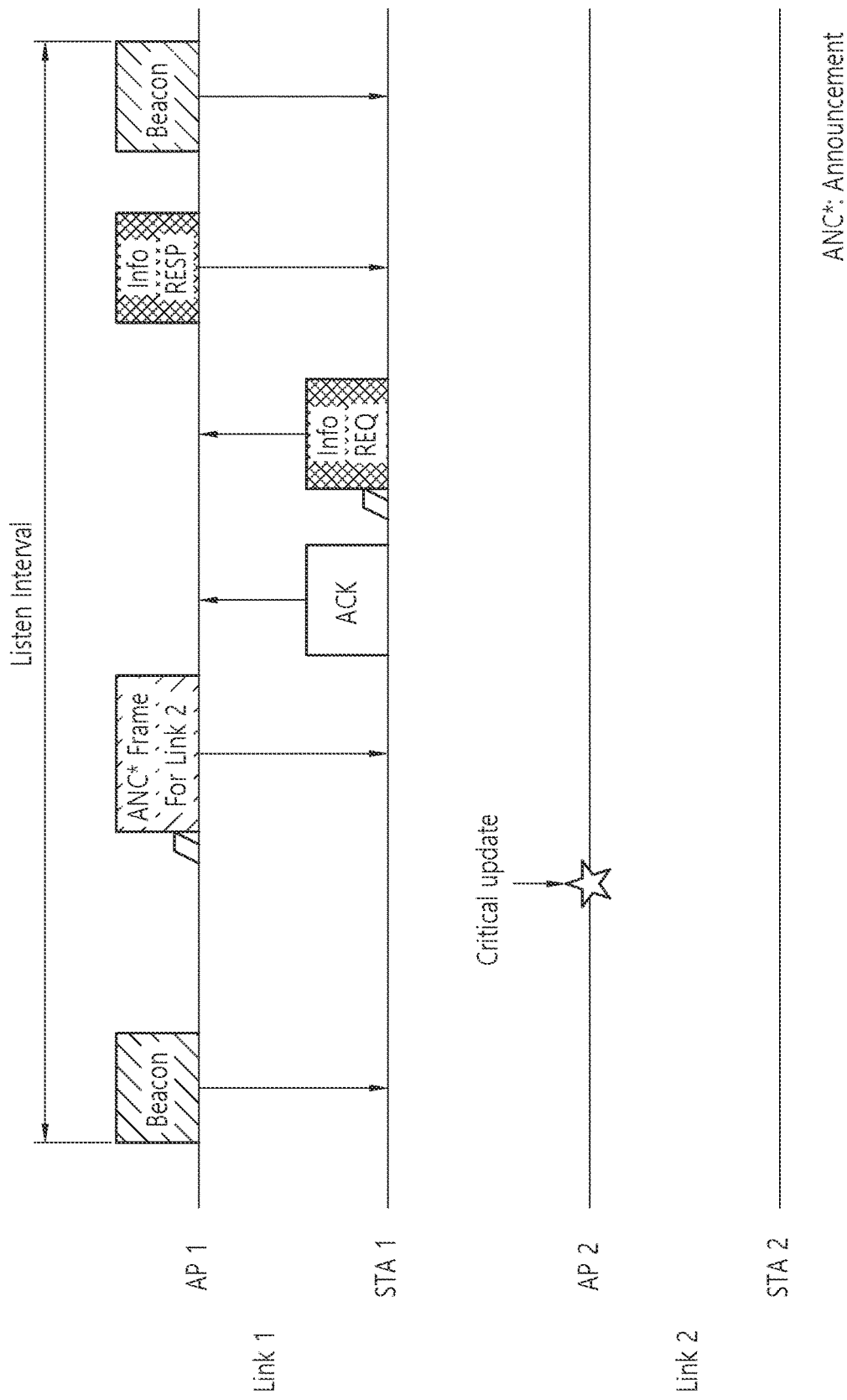
FIG. 24 is a diagram illustrating an embodiment of an announcement implicit method considering a multi-link device.

FIG. 24 is a diagram illustrating an embodiment of an announcement implicit method considering a multi-link device.

Referring to FIG. 24, when the BSS information of AP2 is changed, the AP MLD can notify STA2 that there is currently changed information in AP2 by transmitting an announcement frame through Link 1 instead of Link 2. Upon receiving the announcement frame through Link 1, STA1 may deliver change information through information sharing. This cross-link signaling method can be used more usefully for STAs operating in PS mode because when STA2 is in Doze state for power saving, it can transmit through Link 1 without waking to receive changes. The non-AP MLD, which has confirmed that there is changed information in AP2 through Link 1, can request the changed information as described above through Link 1. At this time, when the STA transmits a (MLD) Probe request frame to acquire critical update change information, the AP receiving it may respond with a (MLD) Probe response frame including information changed due to the critical update, In order to provide information about this to all STAs (Broadcast), it may be broadcast in a Probe Response frame. At this time, the information included in the response frame is information changed due to the most recent critical update (i.e., when the CSN value of AP2 is 5, information changed by updating from CSN 4 to CSN 5) or all critical update information (i.e., AP2's CSN value is 5). All information classified as a critical update event in 11be of Such a response frame may be transmitted through a link through which the STA transmits a request frame or may be transmitted through a link where a critical update actually occurs.

An embodiment of an STA operating in PS mode is as follows.

Figure 25:
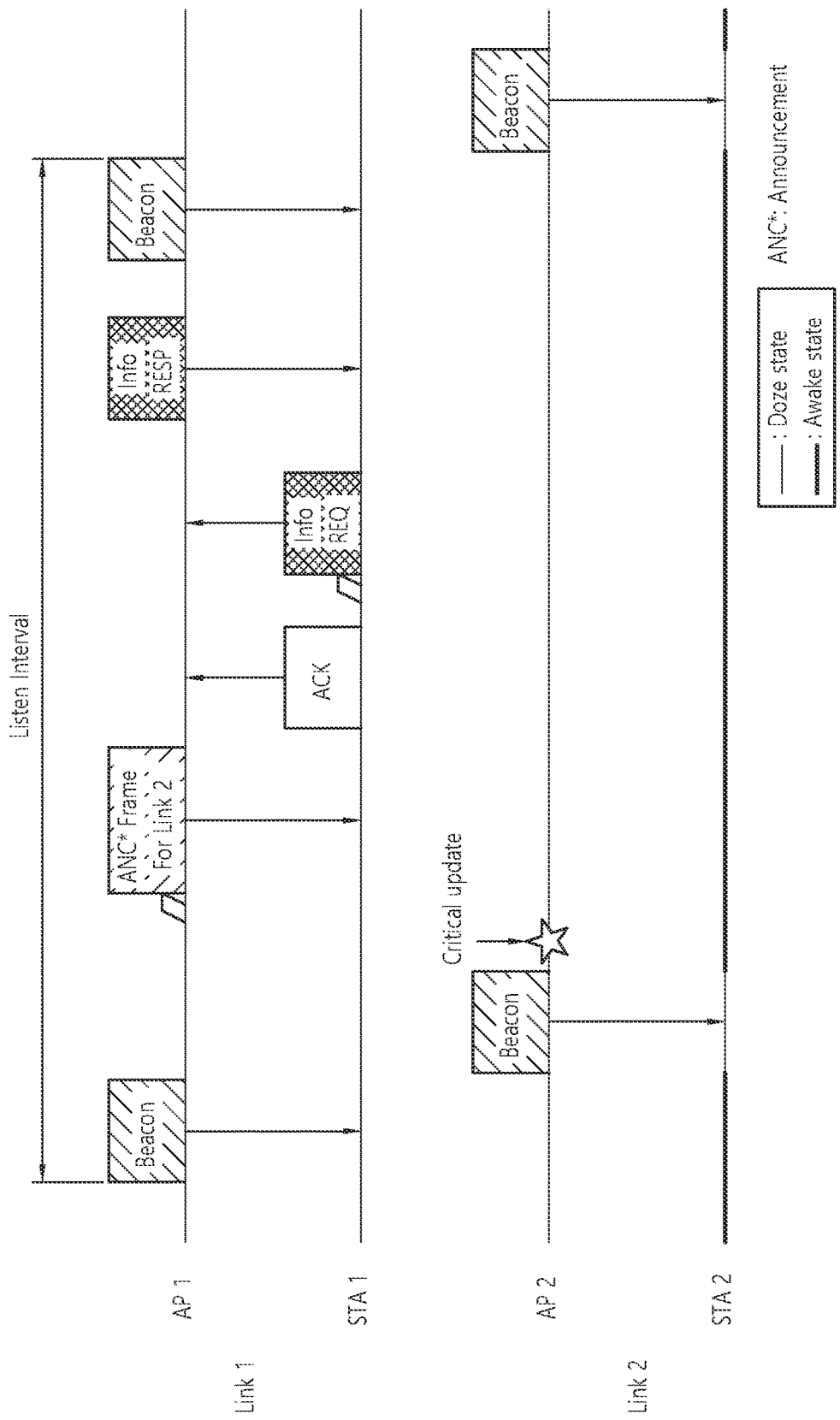
FIG. 25 is a diagram illustrating an embodiment of an operation method of an STA operating in PS mode.

FIG. 25 is a diagram illustrating an embodiment of an operation method of an STA operating in PS mode.

Referring to FIG. 25, when a critical update of AP2 occurs after STA2 operates in PS mode and enters Doze state, STA2 can obtain a changed information indication and request information through Link 1 without awakening. Through the proposed method, the STA can further reduce power consumption.

Alternatively, the non-AP MLD confirming that there is changed information in AP2 through Link 1 may request the changed information through Link 2. An example for this is as follows.

Figure 26:
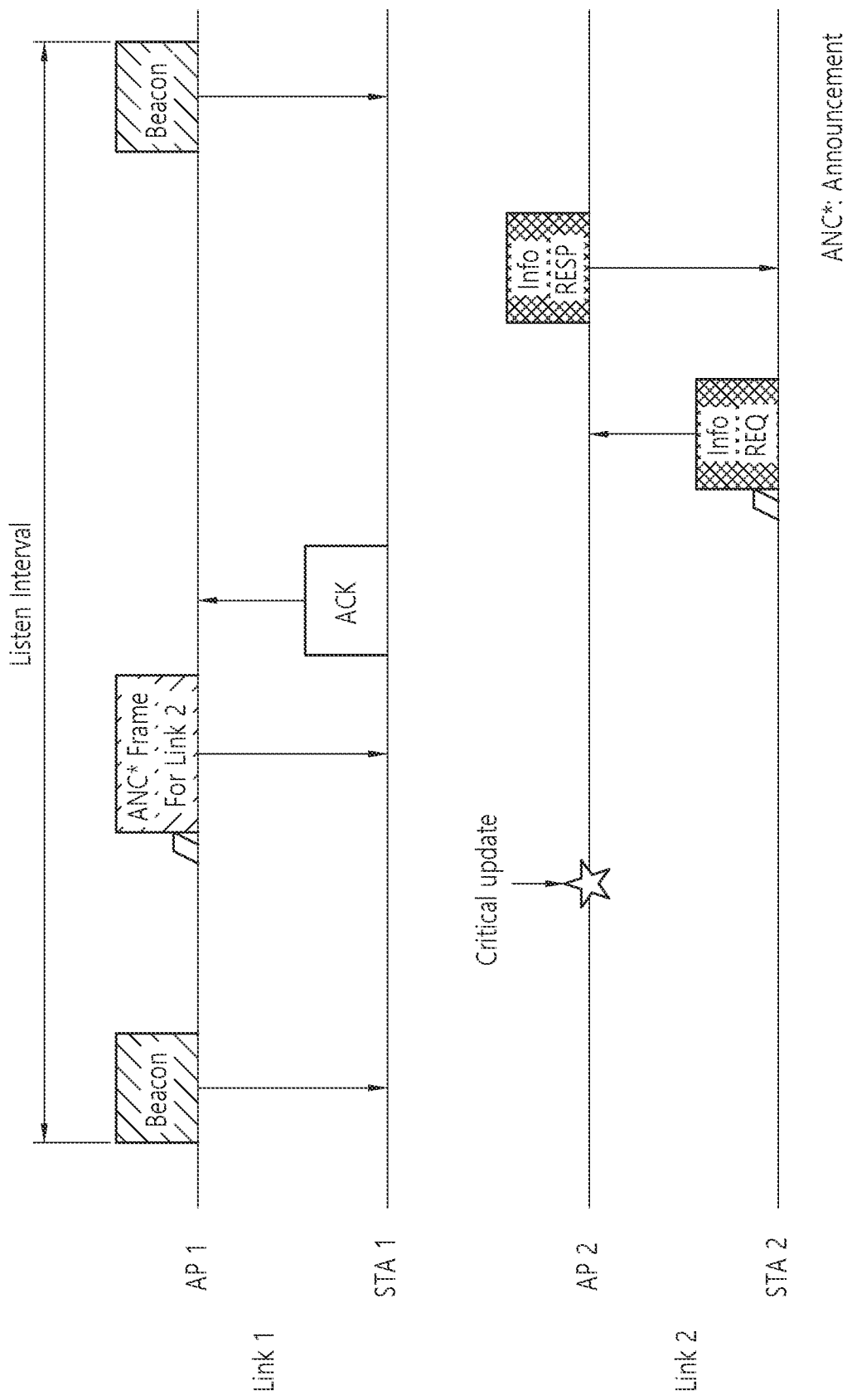
FIG. 26 is a diagram illustrating an embodiment of an announcement implicit method considering a multi-link device.

FIG. 26 is a diagram illustrating an embodiment of an announcement implicit method considering a multi-link device.

Figure 27:
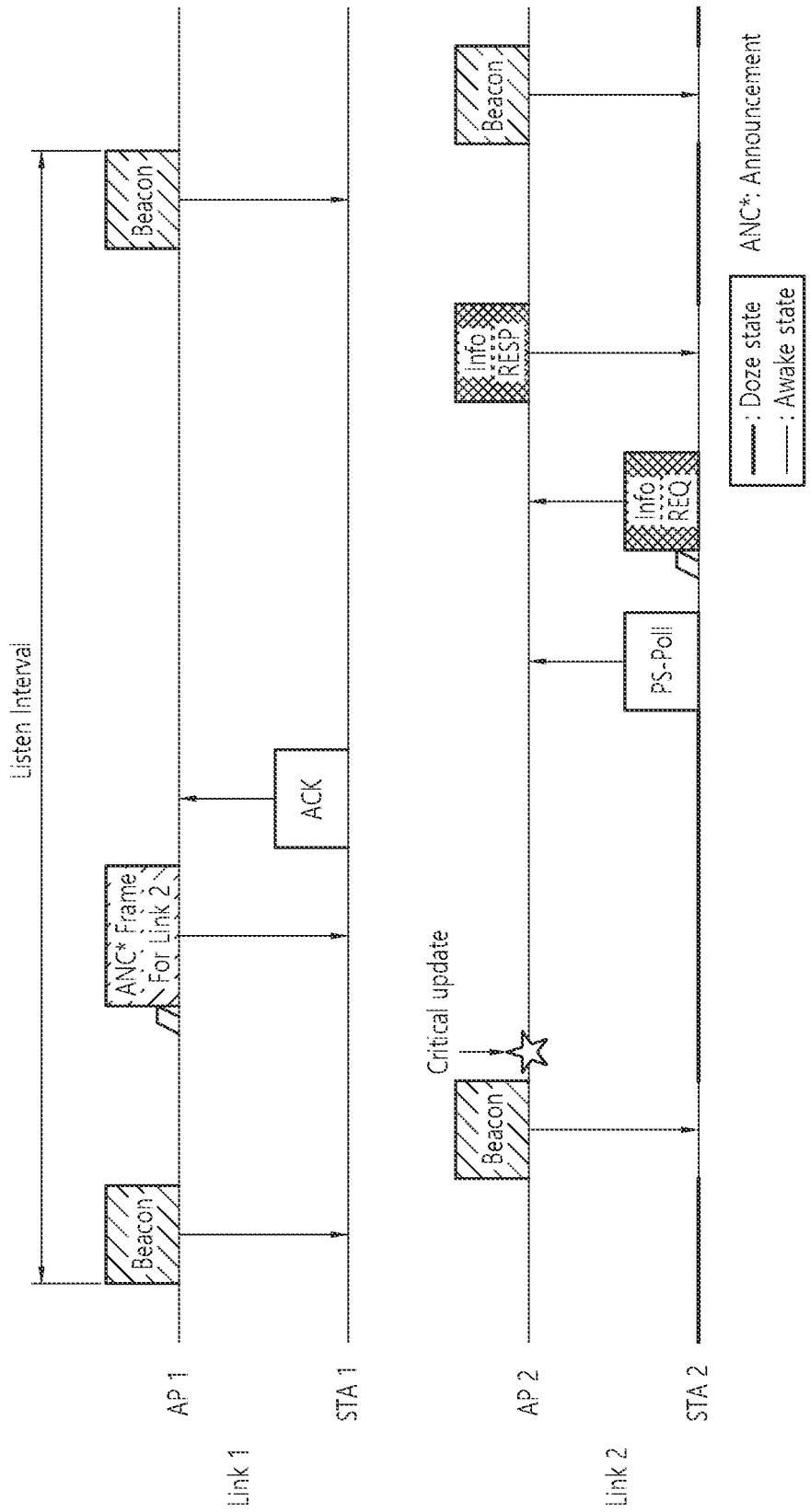
FIG. 27 is a diagram illustrating an embodiment of an operating method of an STA operating in PS mode.

If STA2 operates in PS mode, an embodiment is as shown in FIG. 27.

FIG. 27 is a diagram illustrating an embodiment of an operating method of an STA operating in PS mode.

For example, when BSS change information indication of AP2 is received through Link 1, STA2 may wake up and request desired information through Link 2 only when there is changed information. If it is confirmed through the received announcement frame that there is no currently changed information or there is no change information to be acquired, the STA may maintain the Doze state.

An embodiment of the case of using a probe response frame as an announcement frame for this is as follows.

Figure 28:
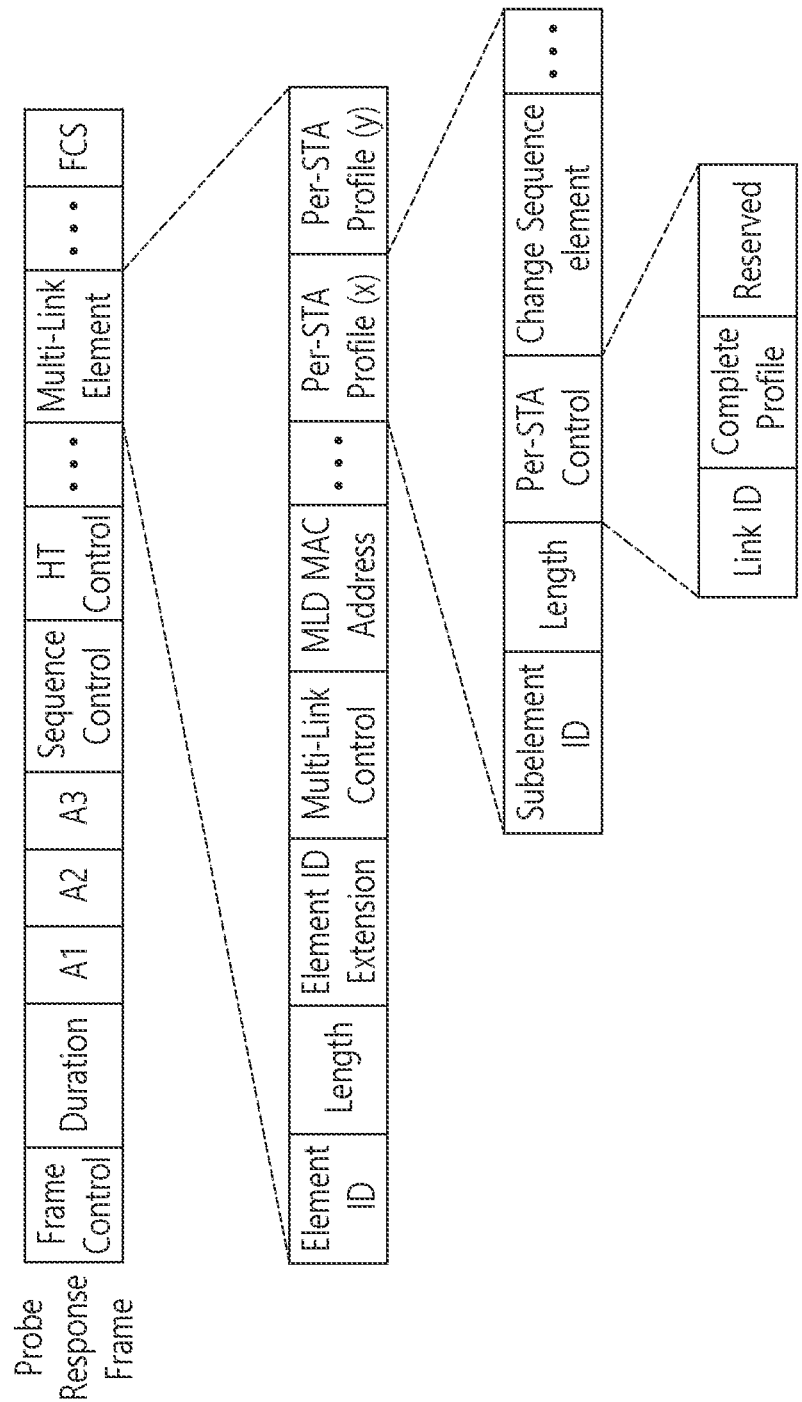
FIGS. 28 and 29 are diagrams illustrating an embodiment of a frame format when a probe response frame is used as an announcement frame.

FIG. 28 is a diagram illustrating an embodiment of a frame format when a probe response frame is used as an announcement frame.

Referring to FIG. 28, when a critical update occurs in the BSS of AP(x), corresponding information may be announced through a (Broadcast) Probe response. In this case, the corresponding probe response frame may inform CSN information (e.g., change sequence element, change sequence field) indicating that a critical update has occurred through the Multi-Link element of the probe response through the above form. Since the corresponding Multi-Link element contains information about the reported AP (i.e., other AP) rather than information about the reporting AP, in the case of a non-AP MLD operating in power save mode, the STA doze through the corresponding announcement frame It is also possible to obtain change information that another STA in the state needs to know. The STA receiving the message received CSN information about another STA it currently has (in 11be, the non-AP STA agreed to maintain the most recently received CSN information) and the announcement frame By comparing CSN information for another AP, it can be known that a critical update has occurred for the currently reported AP. Thereafter, another STA may transmit a probe request frame to acquire critical update change information or may attempt to receive the next Beacon.

This method may be used in combination with the change information delivery method for the reporting AP mentioned above. An example of using the frame format of the probe response frame in this case is as follows. Through this form, the reporting AP can deliver important change information for itself and the presence or absence of change information for the reported AP together depending on the case.

Figure 29:
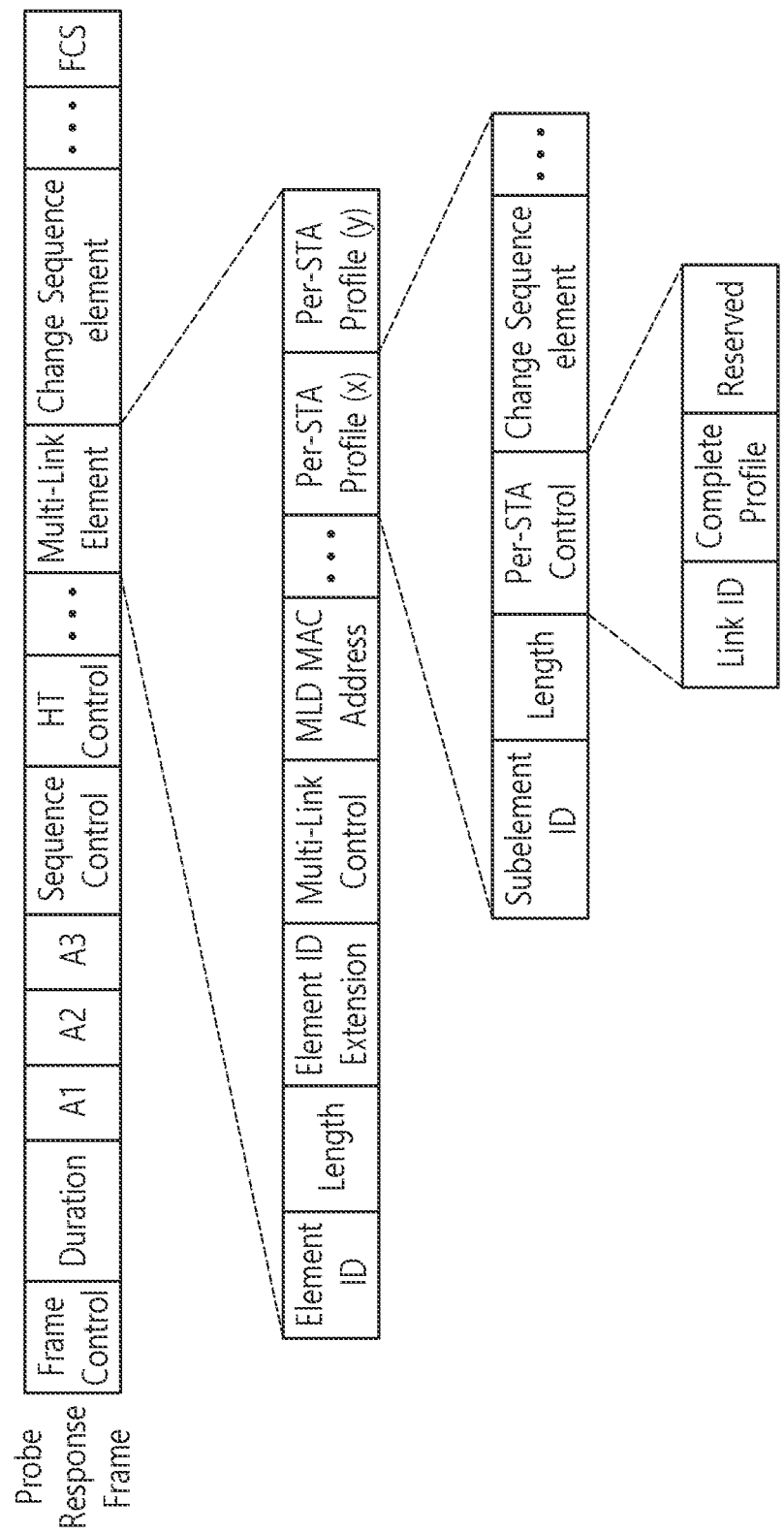

FIG. 29 is a diagram illustrating an embodiment of a frame format when a probe response frame is used as an announcement frame.

In addition, such changes may be notified to the STA by piggybacking them to a DL frame being transmitted instead of a separate announcement. An example for this is as follows.

Figure 30:
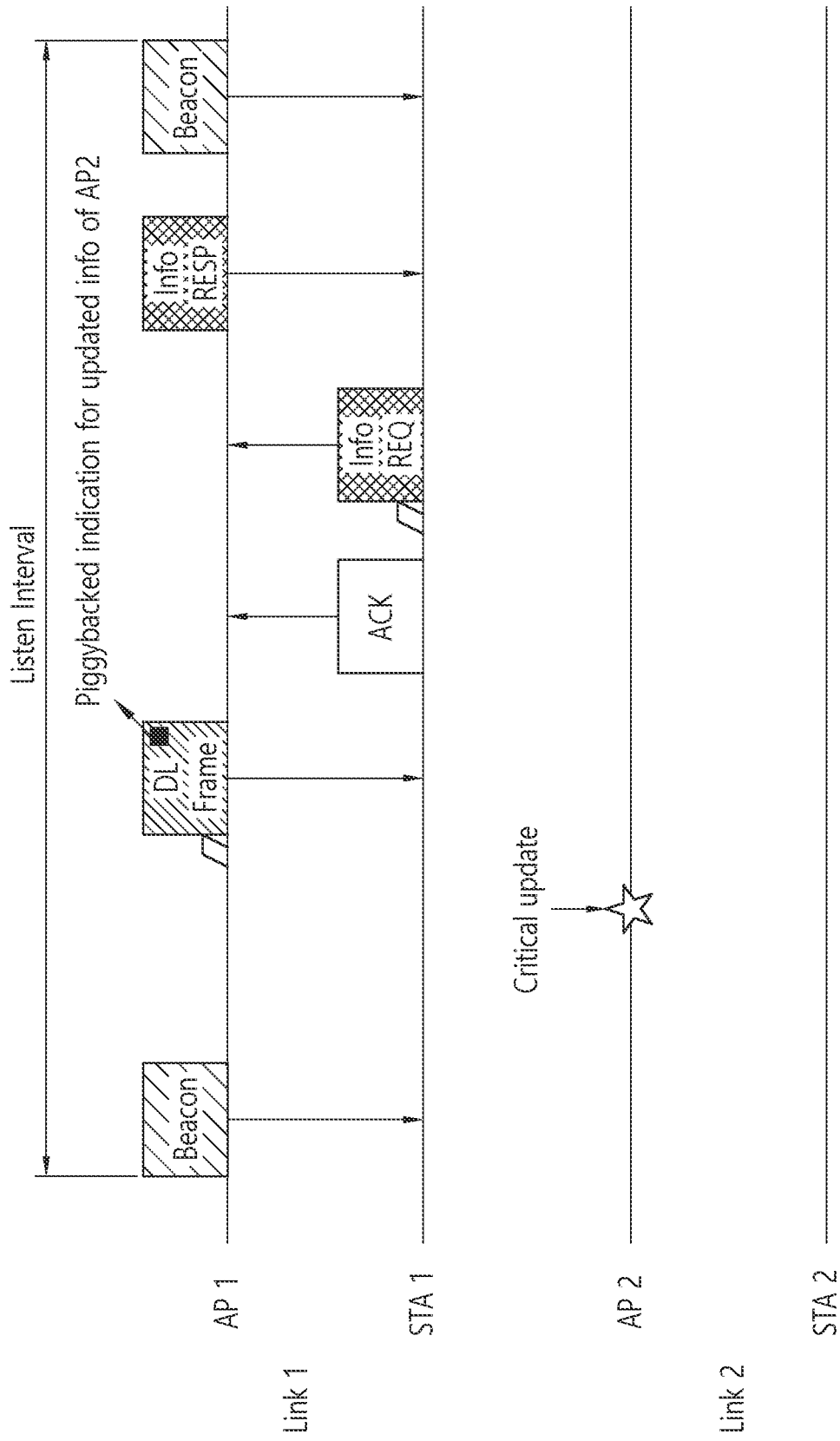
FIG. 30 is a diagram illustrating an embodiment of an announcement implicit method considering a multi-link device.

FIG. 30 is a diagram illustrating an embodiment of an announcement implicit method considering a multi-link device.

Referring to FIG. 30, when a critical update occurs in AP2, if there is a DL frame to be transmitted in AP1, an indication indicating a change in AP2 may be included in the DL frame to be transmitted and delivered to STA2. Upon receiving this, the non-AP MLD may transmit a request message for obtaining desired information or all information through Link 1. If there is a DL frame to be transmitted by AP1, frame overhead can be reduced by not using a separate announcement frame through this method. In addition, when STA2 enters Doze state through PS mode, it can be used more usefully because change information can be transmitted through Link 1 without awakening. An example of this is given below.

Figure 31:
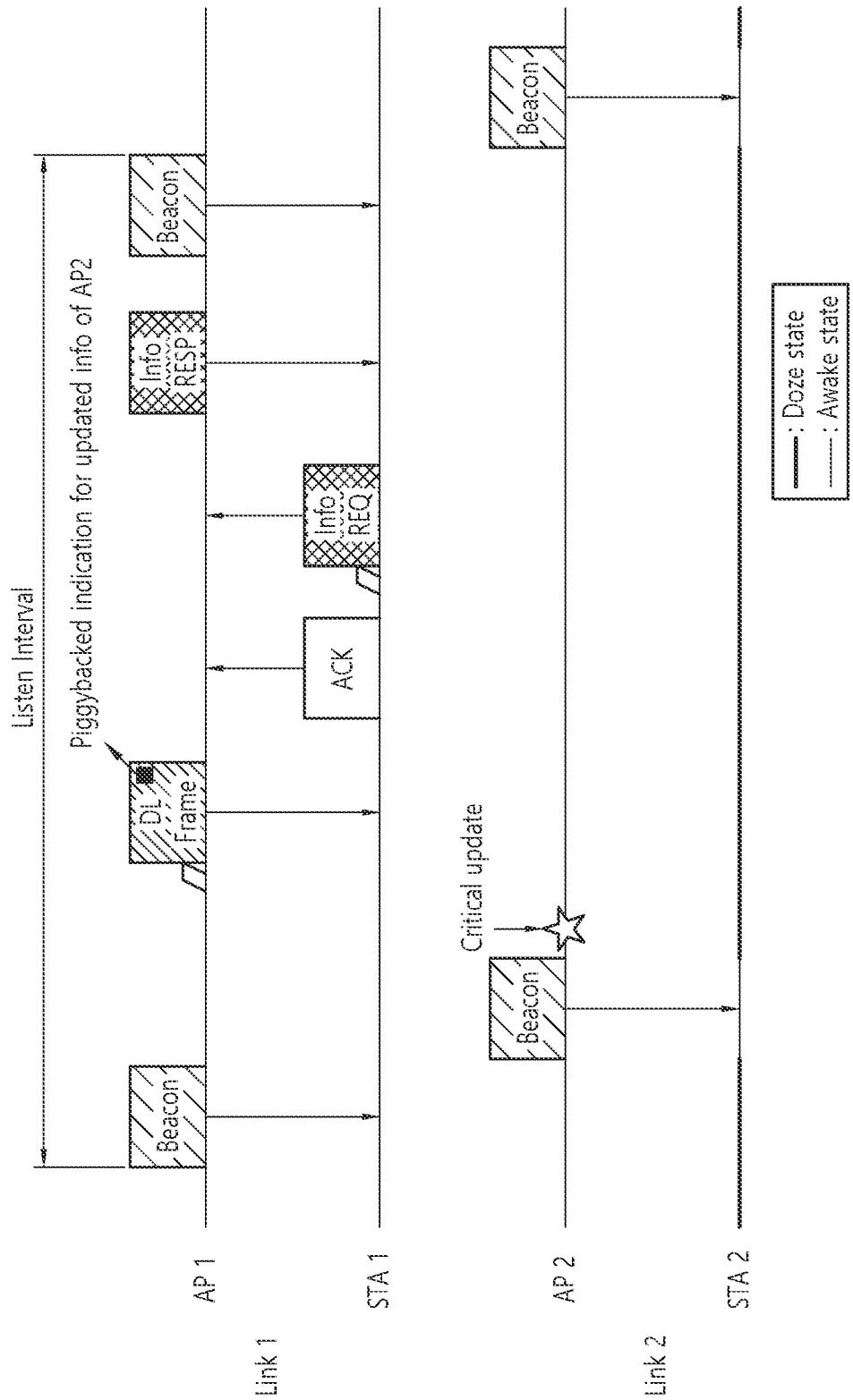
FIG. 31 is a diagram illustrating an embodiment of an operation method of an STA operating in PS mode.

FIG. 31 is a diagram illustrating an embodiment of an operation method of an STA operating in PS mode.

Referring to FIG. 31, when a critical update of AP2 occurs after STA2 operates in PS mode and enters Doze state, STA2 can obtain a changed information indication and request information through Link 1 without awakening. Through the proposed method, the STA can further reduce power consumption.

Alternatively, the non-AP MLD confirming that there is changed information in AP2 through Link 1 may request the changed information through Link 2. An example for this is as follows.

Figure 32:
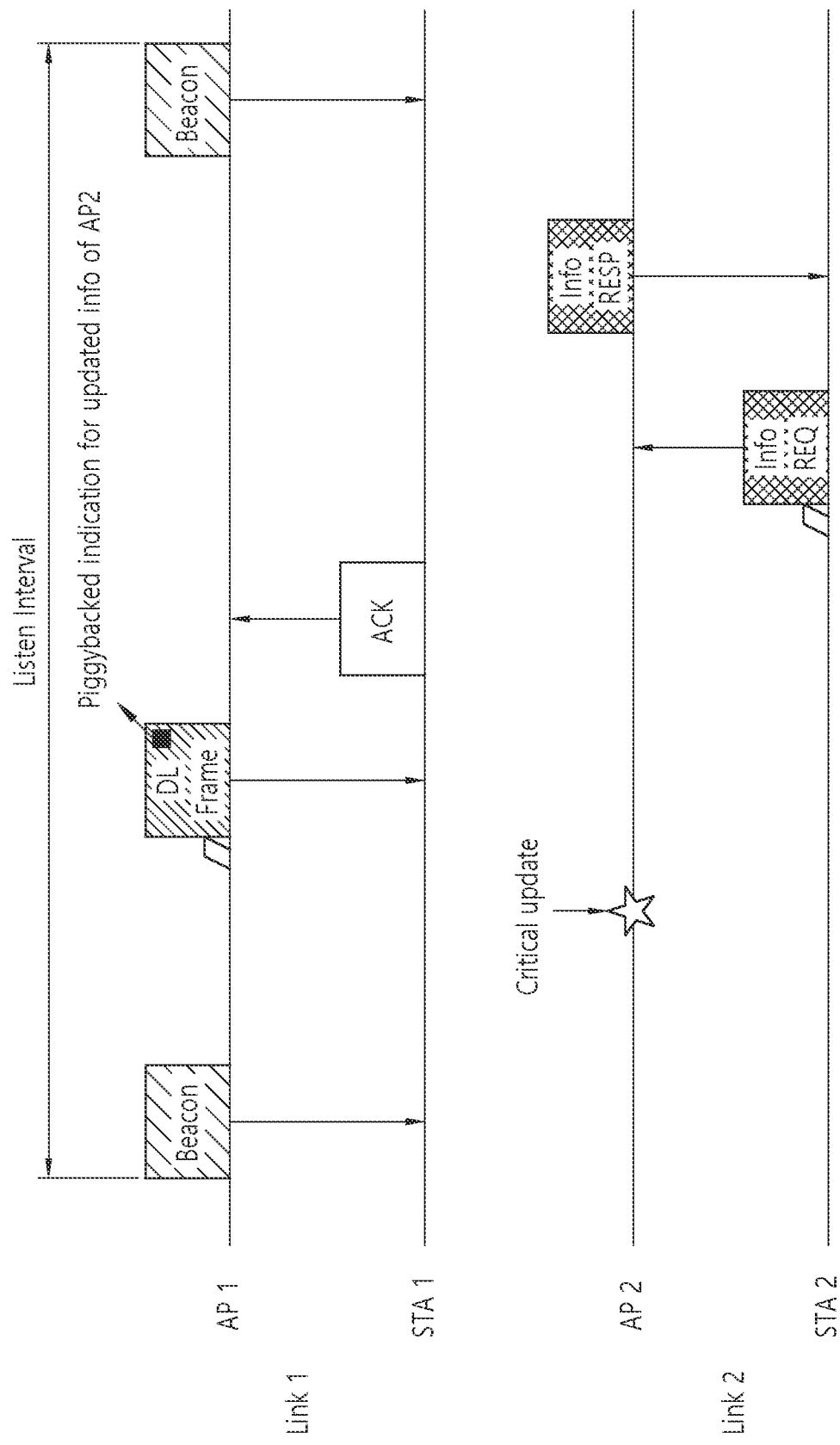
FIG. 32 is a diagram illustrating an embodiment of an announcement implicit method considering a multi-link device.

FIG. 32 is a diagram illustrating an embodiment of an announcement implicit method considering a multi-link device.

Figure 33:
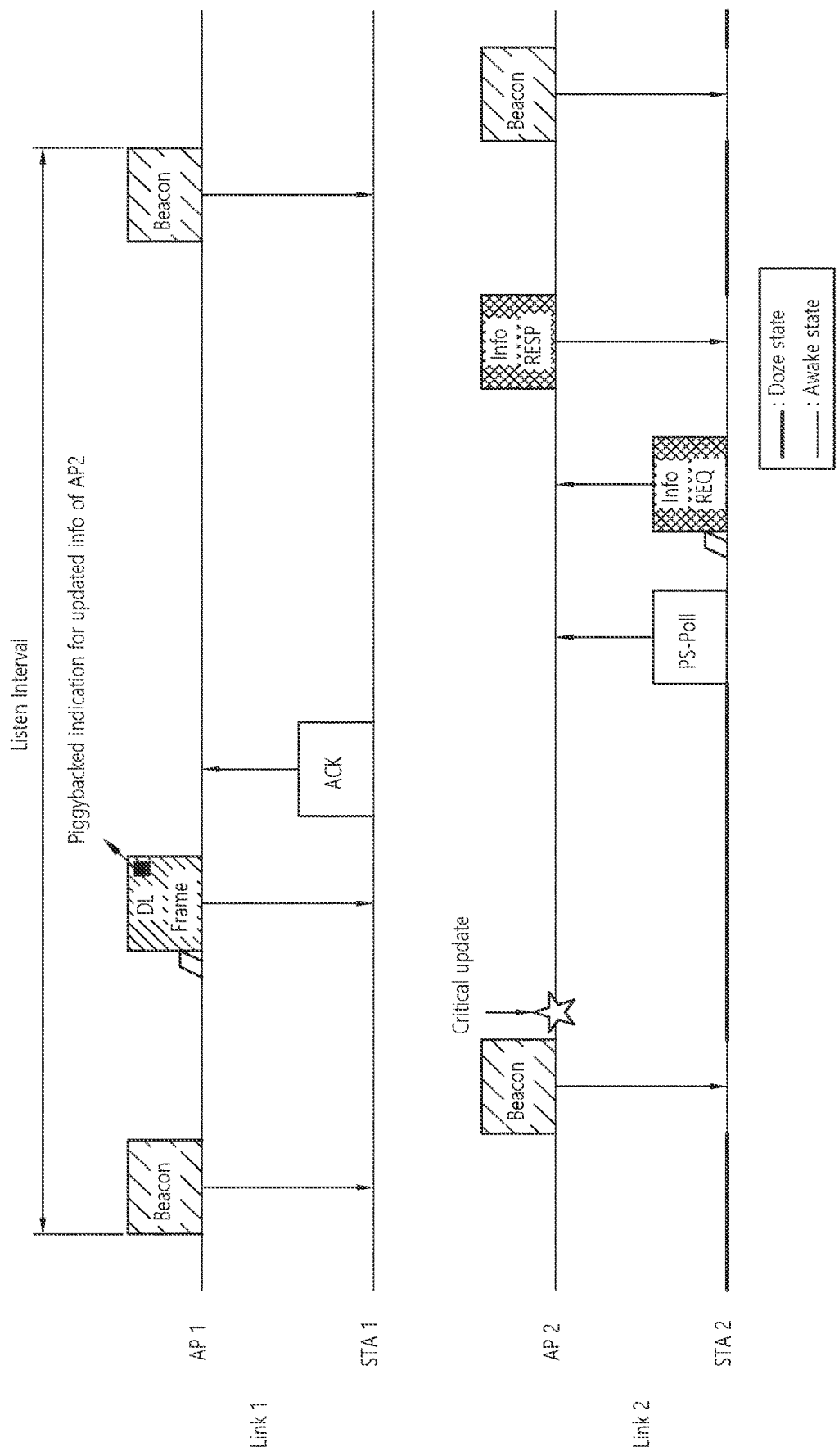
FIG. 33 is a diagram illustrating an embodiment of an operation method of an STA operating in PS mode.

If STA2 operates in PS mode, an embodiment is as shown in FIG. 33.

FIG. 33 is a diagram illustrating an embodiment of an operation method of an STA operating in PS mode.

Referring to FIG. 33, when BSS change information indication of AP2 is received through Link 1, STA2 may awake and request desired information through Link 2 only when there is changed information. If it is confirmed that there is no currently changed BSS information through an indication included in the received DL frame or there is no change information to be acquired, the STA may maintain the Doze state.

2. Announcement Method for Power Saving

In this section, we propose an announcement method for STAs operating in PS (Power Saving) mode.

In general, the AP must inform the STA of this information when BSS information (e.g., critical update, Capabilities, Operation element, etc.) changes. Information on critical update mentioned in this specification refers to elements classified as critical update events in the 11be standard.

Basically, such change information and the presence or absence of change information (e.g., RNR element, change sequence, check beacon, etc.) can be informed through a periodically transmitted beacon and an additional TIM frame. At this time, the change information may be the information itself updated in the BSS (e.g., system information parameter value, etc.), or an indication indicating a version of the change information (e.g., change sequence, etc.) to reduce overhead. However, among the information delivered by the AP, there may be information that needs to be immediately notified to the STA. In particular, since change information and the presence or absence of change information for an important update such as a critical update may affect various operations of the STA, it is better to inform immediately when the change is made. However, the listen interval of the beacon may be different for each STA, and especially for an STA having a rather long listen interval for power saving, receiving change information through the beacon may not be sufficient.

To this end, we propose an announcement method for announcing changed BSS information among APs (including other APs in the same AP MLD) of the AP MLD regardless of the beacon period.

The announcement method proposed in this section informs the STA of this information regardless of the beacon period whenever the AP's BSS information is updated. At this time, the changed BSS information may be included in a separate announcement frame and transmitted, or may be piggybacked and transmitted in a DL frame transmitted by the AP. In addition, in the case of an AP MLD, when an update of BSS information of an AP occurs, this information may be delivered to an STA of a non-AP MLD through another link, if necessary.

If STAs operate in PS mode, some STAs may enter the Doze state and then change to the Awake state. At this time, if there is important change information of the connected AP that has not been delivered during the period in which the specific STA enters Doze, a method to inform the STA of this information when the STA wakes up is required.

Therefore, this specification proposes an announcement method for informing an STA that has awake after a doze period of changed critical information.

In the case of an STA operating in an active mode, since data can be transmitted or received at any time, the AP can inform the STA of important BSS change information as soon as it occurs. However, in the case of an STA operating in PS mode, if the STA enters doze for power saving, this change information cannot be notified to the STA during the doze period.

Basically, considering the STA's TBTT, the BSS change information can be included in the Beacon and transmitted. In the case of an STA operating in PS mode, a longer listen interval may be set for more power reduction or beacon reception may be skipped, transmission of BS S change information through Beacon may not be sufficient. An example of this operation is as follows.

Figure 34:
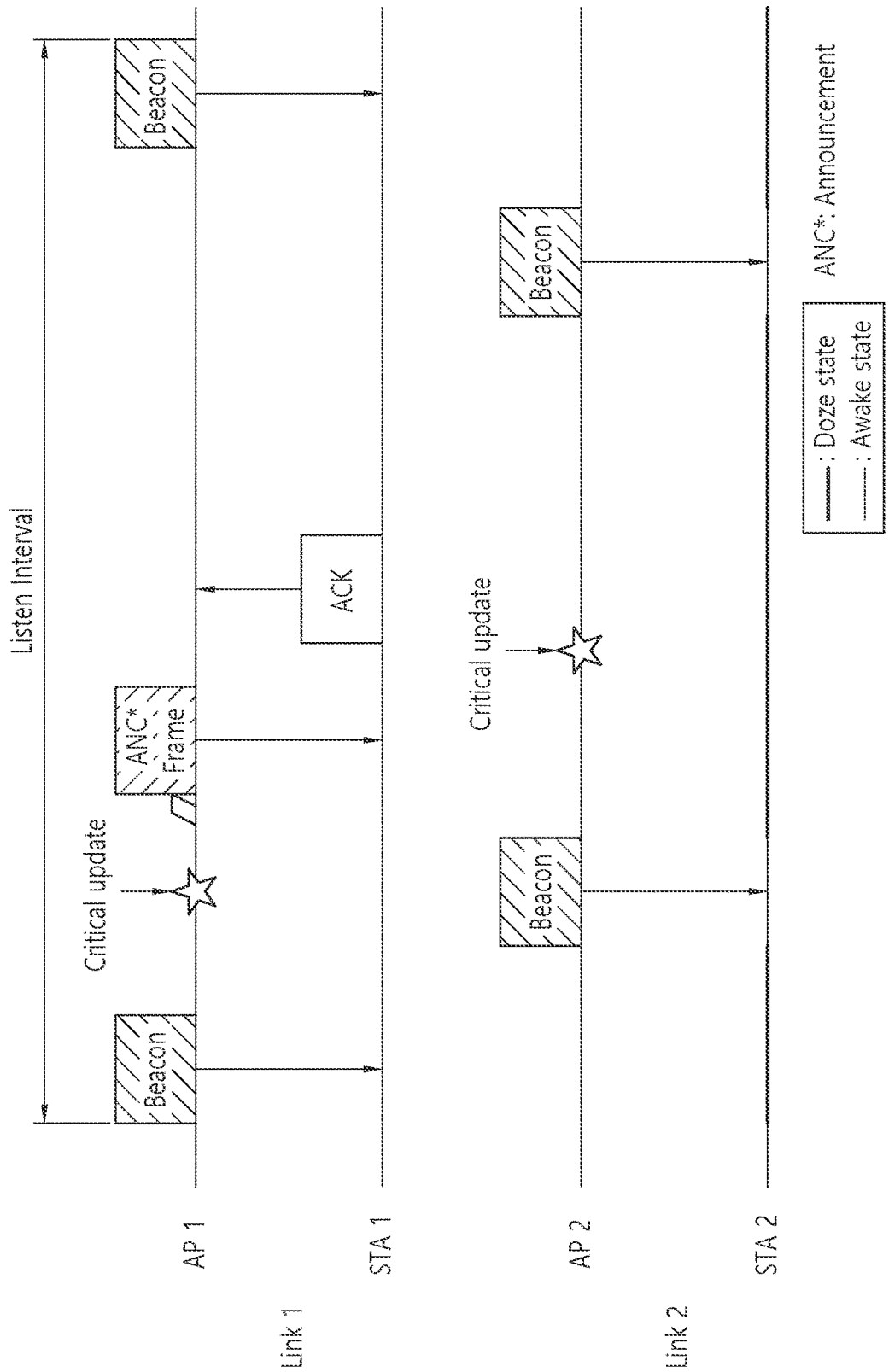
FIG. 34 is a diagram illustrating an embodiment of a method of operating STAs in active mode and PS mode.

FIG. 34 is a diagram illustrating an embodiment of a method of operating STAs in active mode and PS mode.

Referring to FIG. 34, if the STA has updated BSS information for the connected AP during the Doze period, it stores it and confirms that the STA has awake (for example, when PS-Poll/QoS null is received from the STA or When QoS data is received from the STA, etc.), A method in which the AP delivers this information to the STA may deliver important update information regardless of the beacon cycle.

For example, STAs supporting Broadcast TWT maintain a doze state for power saving and then awake for data transmission/reception during a scheduled Broadcast TWT SP received from an AP. At this time, if there is important change information of the connected AP during the period that the awake STA has doze, it must know these changes before transmitting or receiving data.

Figure 35:
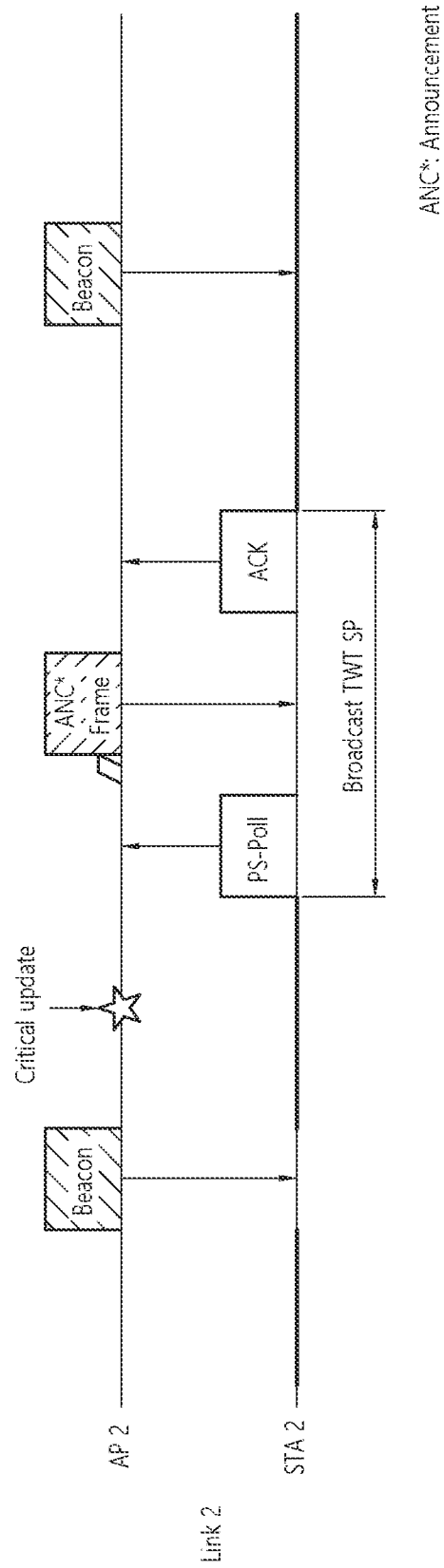
FIGS. 35 to 42 are diagrams illustrating an embodiment of an announcement method.

FIG. 35 is a diagram illustrating an embodiment of an announcement method.

If a critical update occurs after STA2 enters doze due to PS mode, AP2 cannot inform the STA of this. At this time, as shown in FIG. 35, when the STA awakes before receiving the next beacon (e.g., broadcast TWT SP, UL frame transmission, etc.), when the STA awakes, it can inform AP2 of this through PS-Poll. Upon receiving this, the AP knows that the current STA2 has awake and can deliver BSS change information generated during the doze period in an announcement frame.

An example multi-link case for the above example is as follows.

Figure 36:
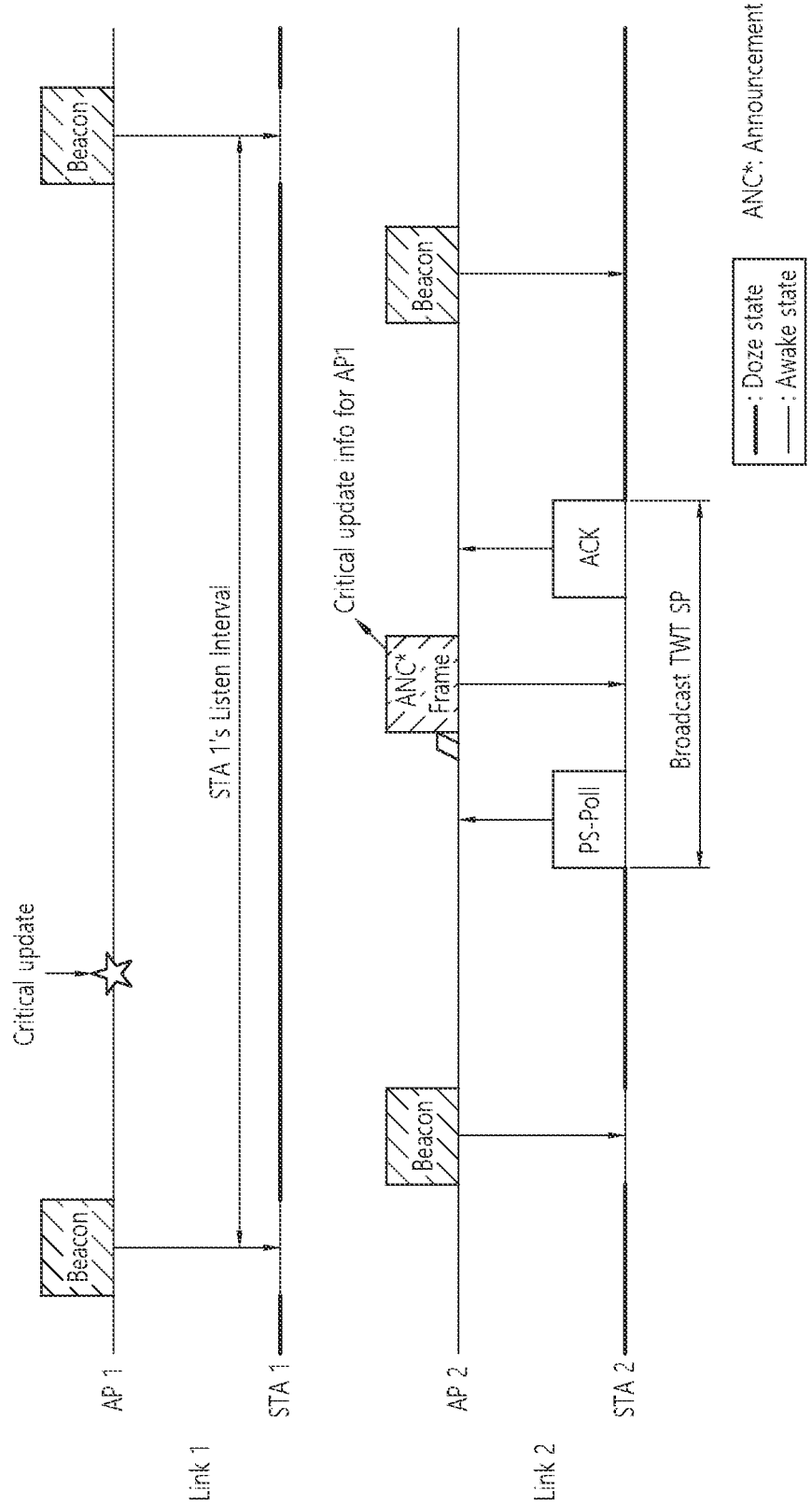

FIG. 36 is a diagram illustrating an embodiment of an announcement method.

Referring to FIG. 36, when an AP MLD and a non-AP MLD are connected by two links, if the non-AP MLD operates in PS mode and STA1 and STA2 awake according to the Listen interval, conventionally, the STA When awake according to the listen interval, critical update information can be checked. At this time, the critical update information may be an updated information parameter value or an indication (e.g., change sequence) indicating a version of the update information. However, when the method proposed in this specification is used, when a critical update occurs in AP1, when STA2 confirms that STA1 awake before the next TBTT point (for example, after receiving PS-Poll/QoS null from STA) case or when UL data is received from the STA, etc.), critical update information of AP1 may be transmitted through Link 2. Through this, STA1 can obtain critical update information for itself through Link 2 before its next TBTT time. Although the example shows that update information for one BSS is included in the ANC Frame, information for several other BSSs may also be included regardless of whether or not they are updated.

Figure 37:
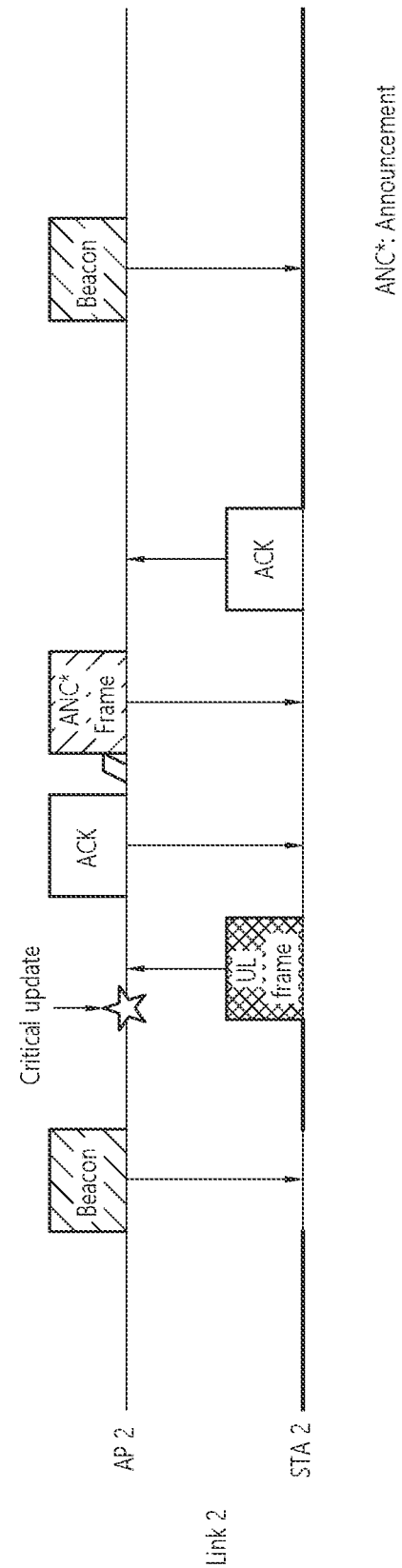

FIG. 37 is a diagram illustrating an embodiment of an announcement method.

Referring to FIG. 37, even when STA2 does a doze and then awakes for UL frame transmission, the AP can notify the changed information after receiving the UL frame from the STA through an announcement frame.

An example multi-link case for the above example is as follows.

Figure 38:
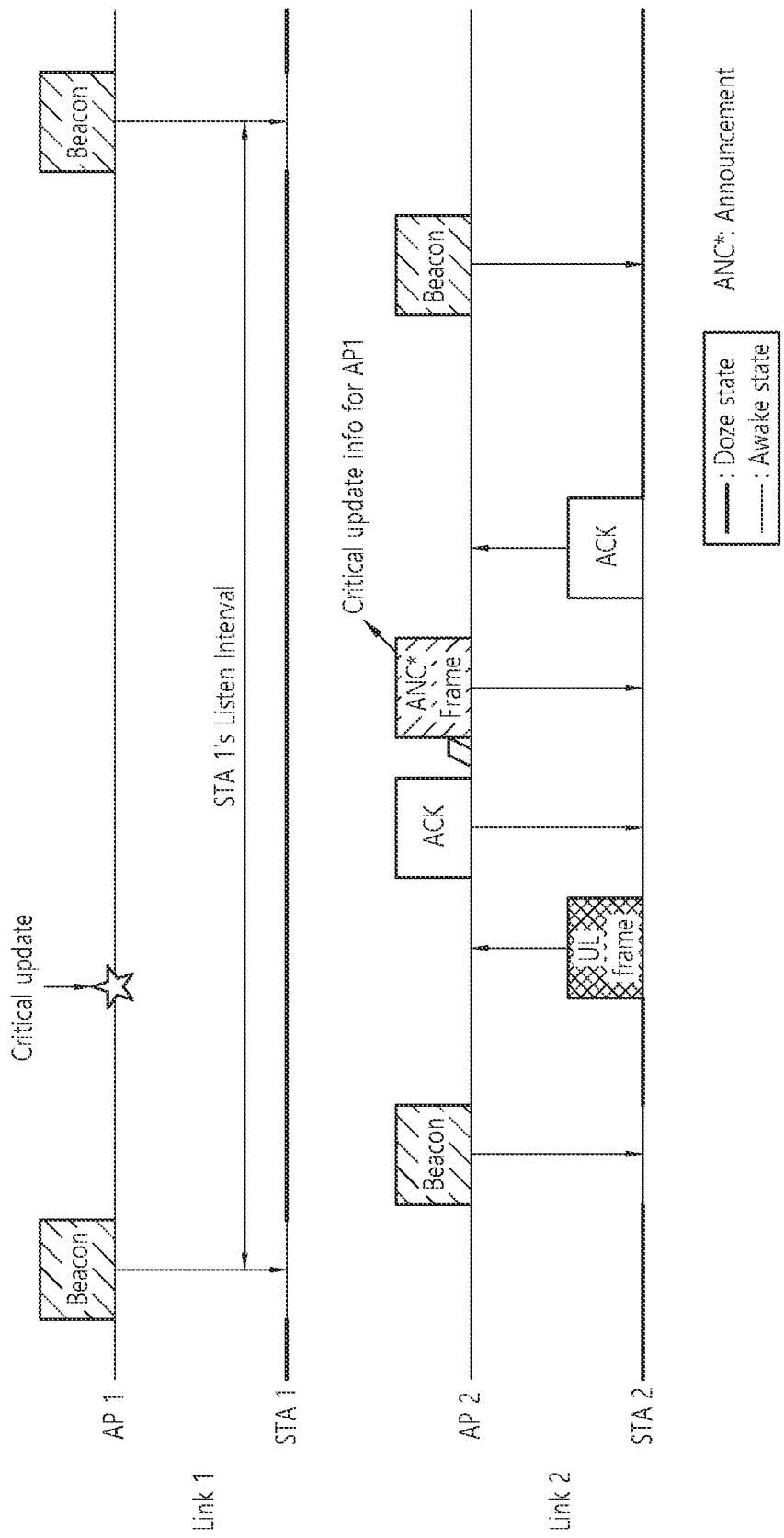

FIG. 38 is a diagram illustrating an embodiment of an announcement method.

Referring to FIG. 38, when an AP MLD and a non-AP MLD are connected by two links, if the non-AP MLD operates in PS mode and STA1 and STA2 awake according to the Listen interval, conventionally, the STA When awake according to the listen interval, critical update information can be checked. At this time, the critical update information may be an updated information parameter value or an indication (e.g. change sequence) indicating a version of the update information. However, when using the method proposed in this specification, when a critical update occurs in AP1, if STA2 wakes up before the next TBTT time of STA1 (e.g., TWT SP, UL frame transmission, etc.), AP2 Critical update information of can be transmitted through Link 2 by transmitting it before STA2 enters the doze state again. Through this, STA1 can obtain critical update information for itself through Link 2 before its next TBTT time. Although the example shows that update information for one BSS is included in the ANC Frame, information for several other BSSs may also be included regardless of whether or not they are updated.

Additionally, when the STA transmits the UL frame when awake, a method of including such BSS change information in the ACK for the UL frame and sending it is also proposed. An example for this is as follows. If the ACK is sent with update information, the frame overhead is reduced and power consumption can be reduced because the STA can doze for a longer period of time.

Figure 39:
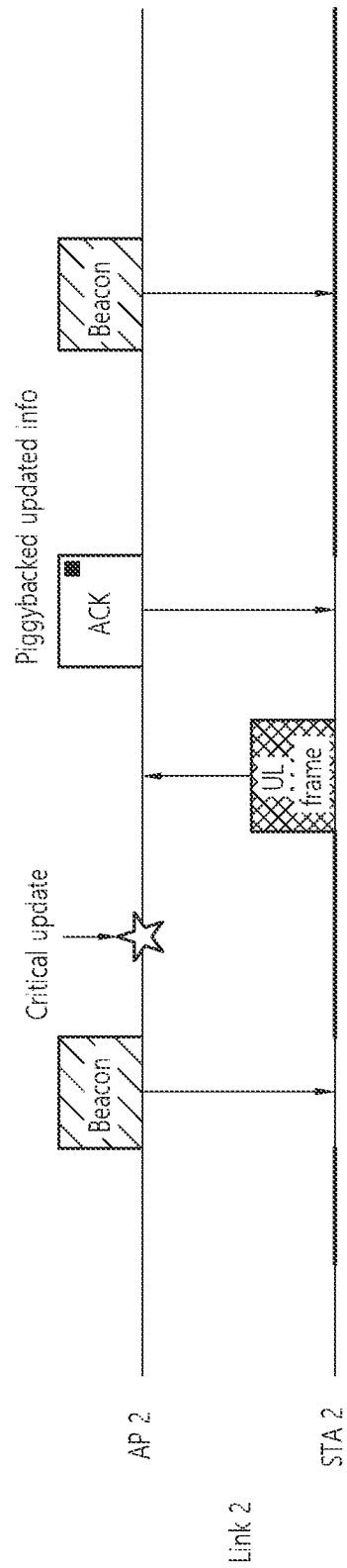

FIG. 39 is a diagram illustrating an embodiment of an announcement method.

An example multi-link case for the above example is as follows.

Figure 40:
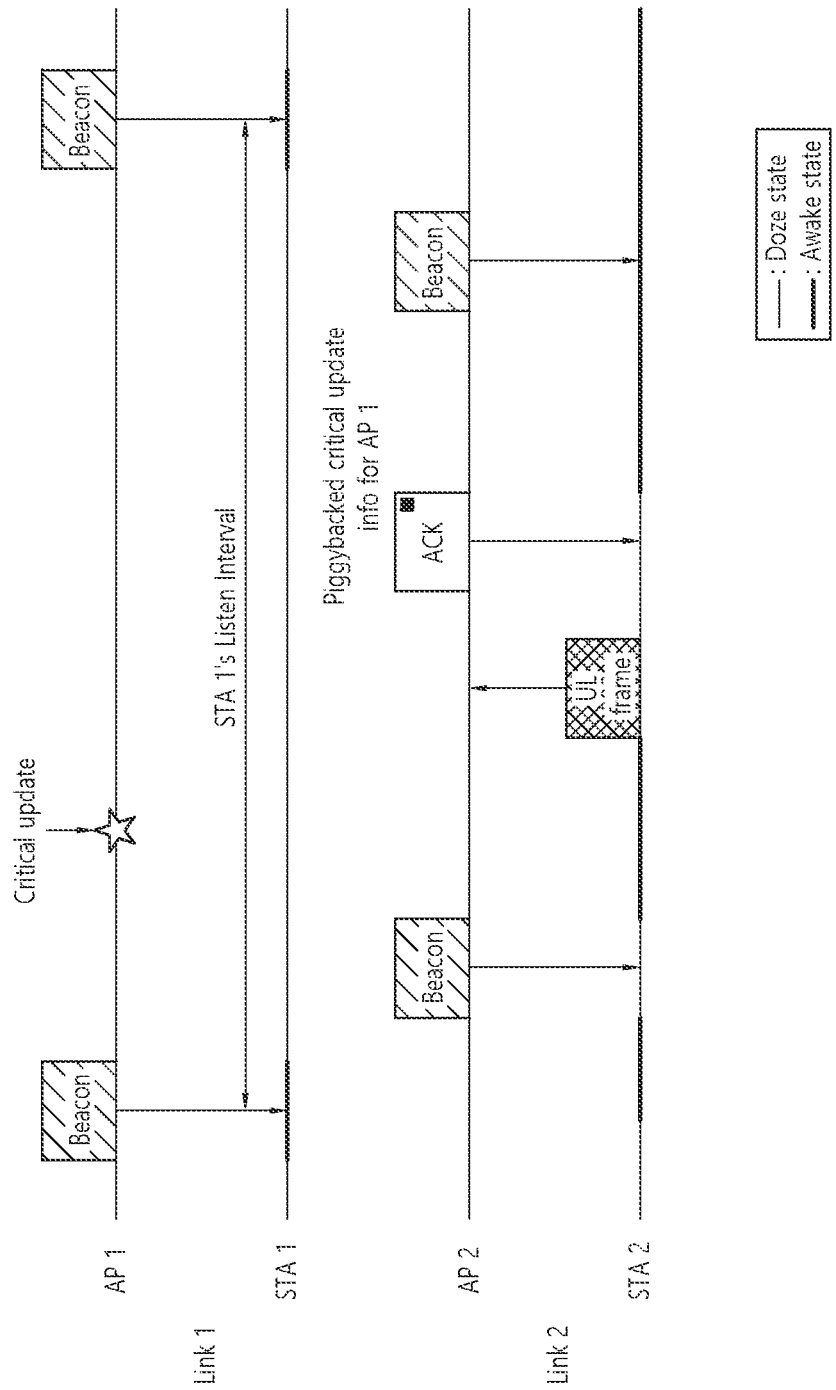

FIG. 40 is a diagram illustrating an embodiment of an announcement method.

Referring to FIG. 40, when an AP MLD and a non-AP MLD are connected by two links, if the non-AP MLD operates in PS mode and STA1 and STA2 awake according to the Listen interval, conventionally, the STA When awake according to the listen interval, critical update information can be checked. At this time, the critical update information may be an updated information parameter value or an indication (e.g., change sequence) indicating a version of the update information. However, when using the method proposed in this specification, when a critical update occurs in AP1, if STA2 wakes up before the next TBTT time point of STA1 (e.g., TWT SP, UL frame transmission, etc.), a method of transmitting such BSS change information by including it in the ACK for the UL frame is also proposed. If the ACK is sent with update information, the frame overhead is reduced and power consumption can be reduced because the STA can doze for a longer period of time. Although the example shows that the ACK Frame includes update information on one BSS, information on several other BSSs may also be included regardless of whether or not they are updated.

At this time, if the AP receives the PS-Poll from the STA and knows that it is awake, if there is a DL frame to be delivered to the STA, the update BSS information may be piggybacked in this DL Frame rather than a separate Announcement frame and delivered. An example of this is given below.

Figure 41:
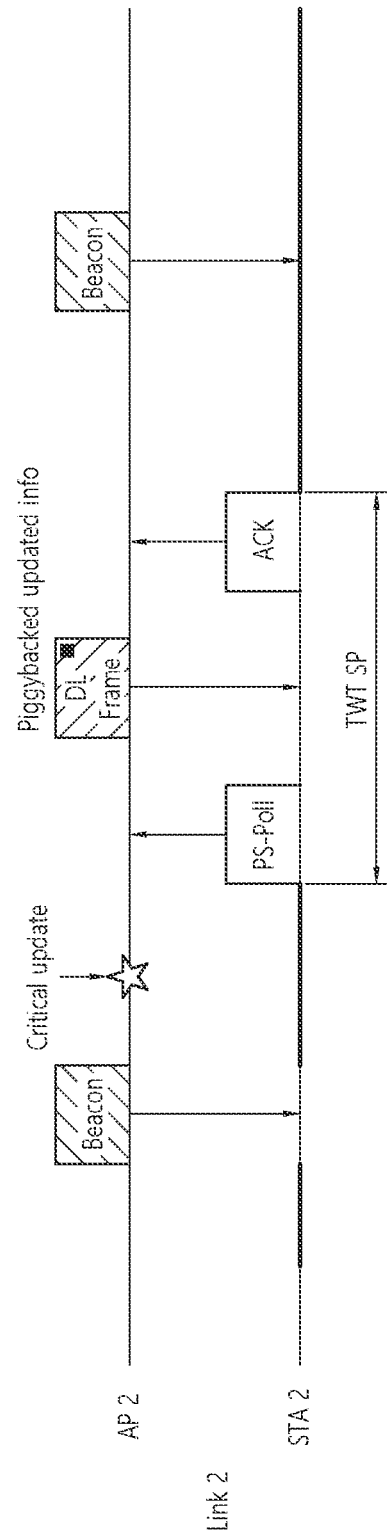

FIG. 41 is a diagram illustrating an embodiment of an announcement method.

An example multi-link case for the above example is as follows.

Figure 42:
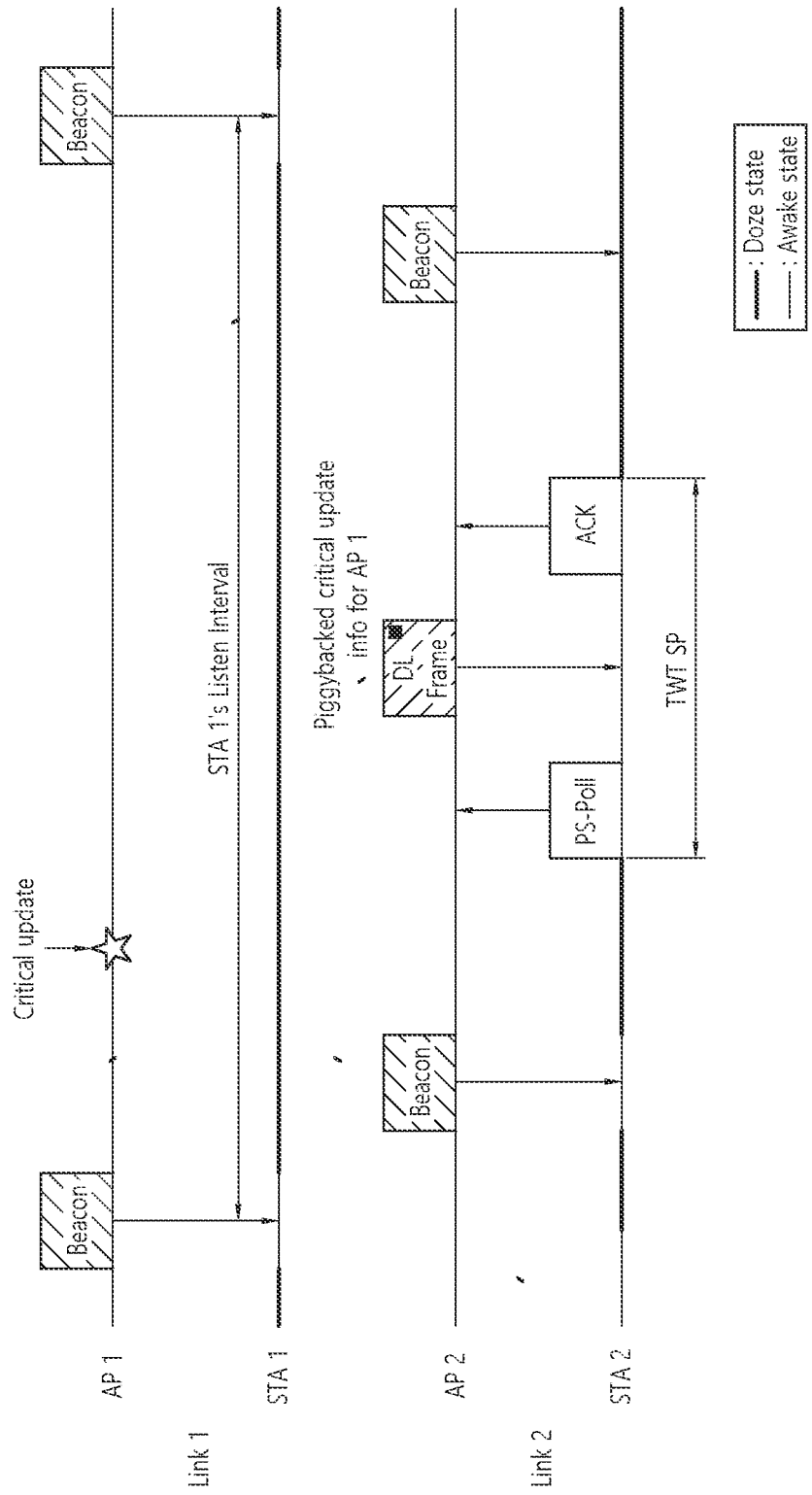

FIG. 42 is a diagram illustrating an embodiment of an announcement method.

Referring to FIG. 42, when an AP MLD and a non-AP MLD are connected by two links, if the non-AP MLD operates in PS mode and STA1 and STA2 awake according to the Listen interval, conventionally, the STA When awake according to the listen interval, critical update information can be checked. At this time, the critical update information may be an updated information parameter value or an indication (e.g. change sequence) indicating a version of the update information. However, when using the method proposed in this specification, when a critical update occurs in AP1, when STA2 knows that STA2 has awake before the next TBTT time point of STA1 (e.g., TWT SP, UL frame reception, PS-poll reception etc.), if there is a DL frame to be delivered to STA2, the update BSS information may be piggybacked and delivered to this DL Frame instead of a separate Announcement frame.

If update information is included in the DL Frame and sent, frame overhead is reduced, and power consumption can be further reduced because the STA can doze for a longer period of time. Although the example shows that update information for one BSS is included in the DL Frame, information for several other BSSs may also be included regardless of whether or not they are updated.

An STA receiving changed information through this method can operate based on the changed information without having to wait for the next beacon.

3. Signaling for the Announcement Method

This section describes how to signal the announcement method proposed above.

In order to operate based on the announcement method proposed in this section, two methods for activating the operation can be proposed. First, as a static method, it is an operation activation method through capability negotiation between an AP MLD and a non-AP MLD in a multi-link setup process. The second is the dynamic method, which allows the non-AP MLD to activate or deactivate the operation of the corresponding method as needed after multi-link setup.

First of all, the following fields are defined to indicate this operation. The names or hierarchies of fields proposed in this specification may be changed according to later disclosure.

Support Announcement method: Information indicating whether the corresponding MLD supports the Announcement method. If it has a value of 1, it means that the corresponding MLD can support the announcement method, and if it has a value of 0, it means that the corresponding method function is not supported. The corresponding information may indicate whether or not support is available at the MLD level, but may also indicate whether or not support is available at the link level. If the MLD level indicates support, all links in the MLD support the corresponding mode if the MLD supports it, and if not, all links in the MLD do not support the corresponding mode. Alternatively, if the corresponding information indicates support at the link level, it indicates support for each entity within the MLD. At this time, a Link indicator (e.g., Link ID) can be used to indicate whether each entity is supported. When the corresponding information is used together with the Link indicator (e.g., Link ID), it can indicate whether or not the announcement method is supported for each specific entity in the MLD. That is, the corresponding operation can be independently supported for each entity within the MLD.

For example, such information may be defined in the EHT MAC Capabilities information field or the like.

Announcement method Mode: Information indicating whether the Announcement method operation of the corresponding MLD is activated. If the corresponding information has a value of 1, it means that the announcement method of the corresponding MLD has been activated, and if it has a value of 0, it means that it has been deactivated.

The corresponding information may indicate whether or not it is activated at the MLD level, but it may also indicate whether it is activated or not at the link level. If activation or not is indicated at the MLD level, activation or deactivation of the corresponding mode for the MLD is indicated. If the corresponding mode is activated for the MLD, all links in the MLD are activated for the corresponding mode, and if the corresponding mode is deactivated for the MLD, all links in the MLD are deactivated for the corresponding mode. Alternatively, if the corresponding information indicates activation at the link level, it can indicate activation for each entity in the MLD. At this time, a Link indicator (e.g., Link ID) can be used to indicate whether each entity is activated. When the corresponding information is used together with the Link indicator (e.g., Link ID), it can indicate whether or not the announcement method is activated for each specific entity in the MLD. That is, the operation can be independently controlled for each entity within the MLD. This mode can be indicated semi-static or dynamic. For example, in the case of semi-static, it can be included in EHT capability or EHT operation element, in the case of dynamic indication, it may be piggy back to a frame (e.g., control frame, data frame, null frame, etc.) or indicated through an A-Control field or Control field.

3-1. Static Signaling for the Announcement Method

The announcement method proposed in this specification can be indicated in a static way. If the corresponding method (i.e., announcement method) is supported statically, it operates as follows.

If the AP or STA supports the operation of the corresponding announcement method, it has a "Support Announcement method" value of 1. In the link setup process, when both the STA and the AP support the corresponding mode (i.e., when "Support Announcement method"=1), the operation is based on the corresponding method after the link setup process through the capability negotiation process.

Figure 43:
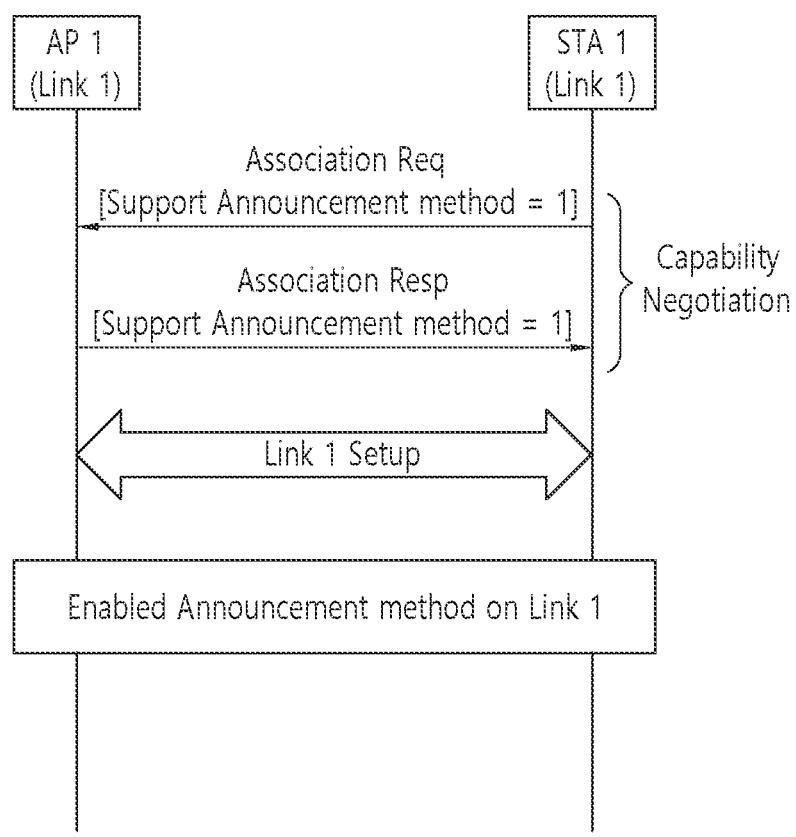
FIG. 43 is a diagram illustrating an embodiment of a static signaling method of a single link device.

FIG. 43 is a diagram illustrating an embodiment of a static signaling method of a single link device.

Referring to FIG. 43, when non-AP MLD and AP MLD perform multi-link setup, through capability negotiation for an entity that supports the corresponding method (i.e., when "Support Announcement method" has a value of 1) After multi-link setup, it operates in the corresponding way. At this time, if the method is supported at the MLD level, the non-AP MLD or AP MLD can operate based on the method for all entities within the MLD.

Figure 44:
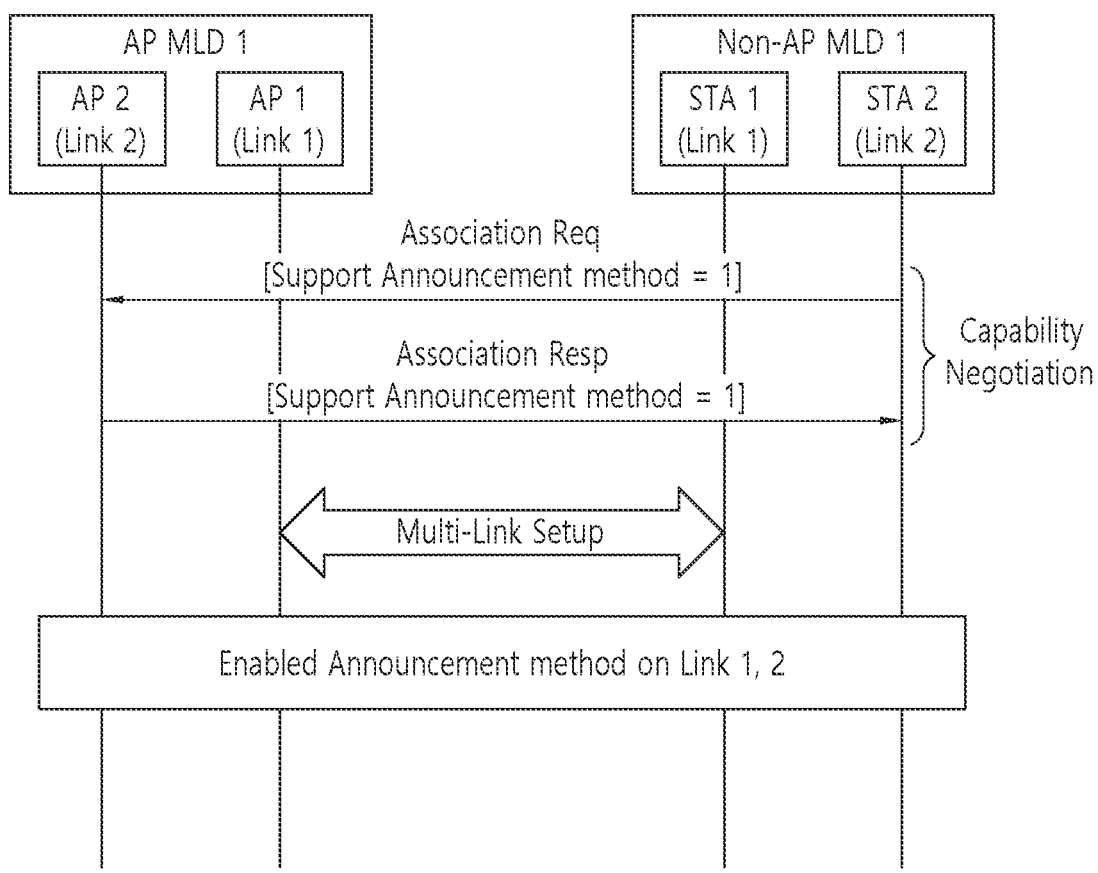
FIG. 44 is a diagram illustrating an embodiment of a static signaling method of a multi-link device (when supporting an MLD level).

FIG. 44 is a diagram illustrating an embodiment of a static signaling method of a multi-link device (when supporting an MLD level).

Referring to FIG. 44, if the corresponding method is supported at the link level, the corresponding method operates only for non-AP MLD or an entity supporting the corresponding method within the AP MLD. As in the following embodiment, when a corresponding method is supported at the link level, whether or not the corresponding method is supported for each link may be indicated and notified. Based on the corresponding information, the non-AP MLD and AP MLD can independently operate based on the corresponding method for each link.

Figure 45:
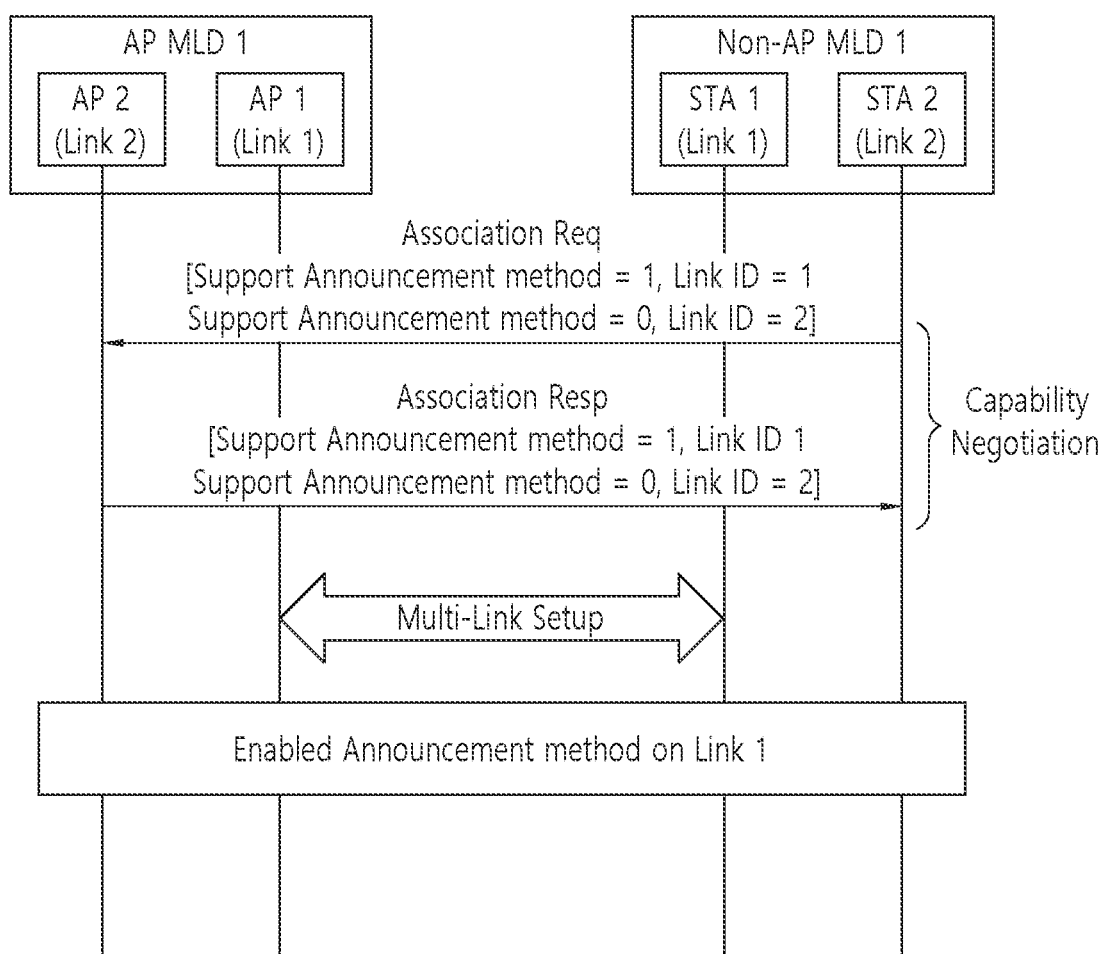
FIG. 45 is a diagram illustrating an embodiment (when link level is supported) of a static signaling method of a multi-link device.

FIG. 45 is a diagram illustrating an embodiment (when link level is supported) of a static signaling method of a multi-link device.

3-2. Dynamic Signaling for the Announcement Method

The announcement method proposed in this specification can be indicated in a dynamic way. If the corresponding method (i.e., announcement method) is dynamically supported, it operates as follows. In this method, after multi-link setup, the STA can freely control whether or not the corresponding method is activated according to circumstances using an A-Control field or a Control field. For example, the AP has "Announcement method mode" information indicating whether or not the corresponding method is activated. At this time, if the STA wants to activate the method, it can be requested by piggy backing a frame (e.g., control frame or data frame, etc.) or by indicating "Announcement method mode"=1 in the A-Control field or Control field. Upon receiving this, the AP activates the announcement method and then operates based on the corresponding method. Conversely, if STA wants to disable the method, it can be requested by piggy backing a frame (e.g., control frame or data frame, etc.) or by indicating "Announcement method mode"=0 in the A-Control field or Control field. Upon receiving this, the AP deactivates the corresponding method.

Figure 46:
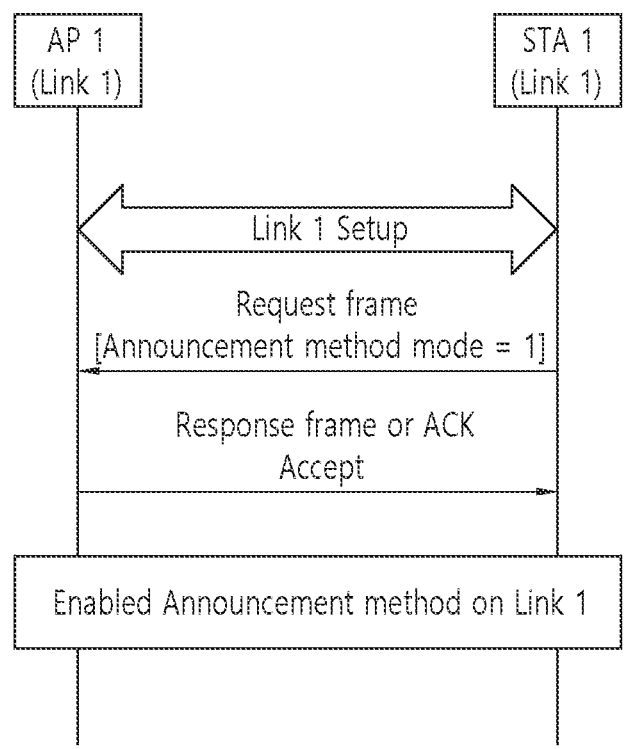
FIG. 46 is a diagram illustrating an embodiment of a dynamic signaling method of a single link device.

FIG. 46 is a diagram illustrating an embodiment of a dynamic signaling method of a single link device.

Referring to FIG. 46, when an MLD with multi-link wants to activate a corresponding method, the STA of the non-AP MLD may transmit a message requesting activation of the corresponding method to the connecting AP of the AP MLD. It can be requested by piggy backing in the request frame (e.g., control frame or data frame, etc.) or by indicating "Announcement method mode"=1 in the A-Control field or Control field. Upon receiving this, the AP activates the announcement method for all links within the AP MLD, and then operates based on the corresponding method. Conversely, if the STA wants to deactivate the corresponding method, it can be requested by piggy back in a frame (e.g., control frame or data frame, etc.) or by indicating a value of "Announcement method mode"=0 in the A-Control field or Control field. Upon receiving this, the AP deactivates the corresponding method for all links within the AP MLD.

Figure 47:
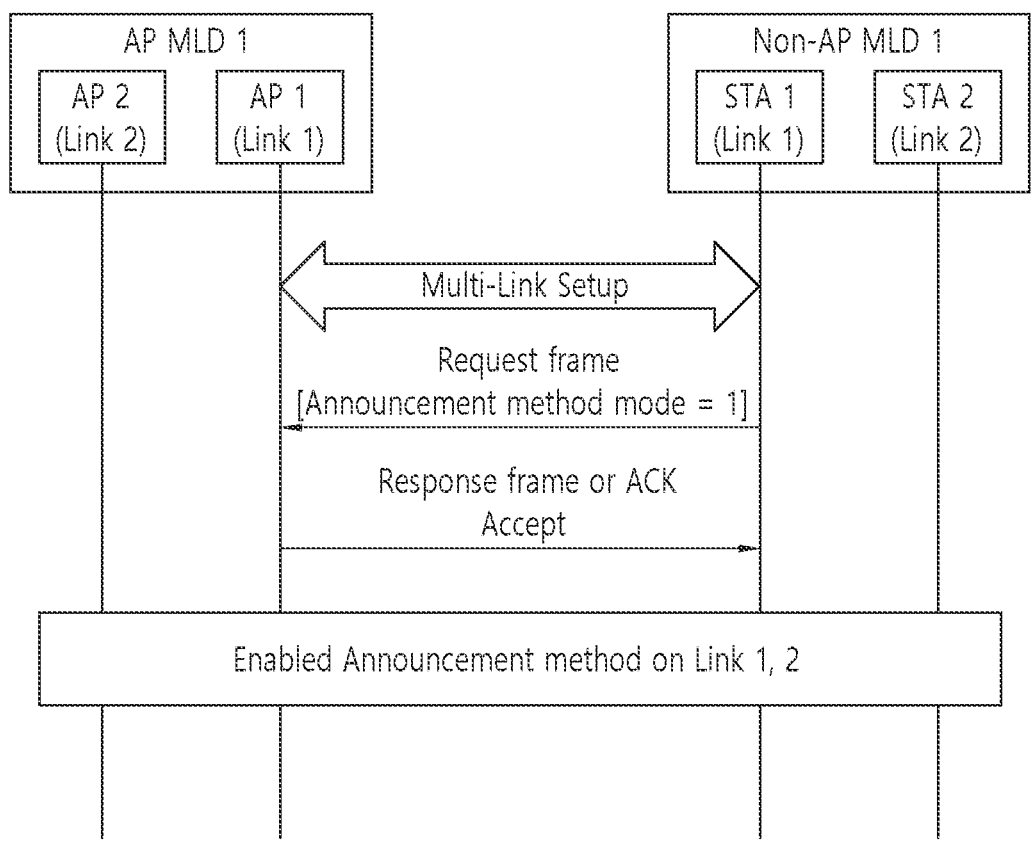
FIG. 47 is a diagram illustrating an embodiment of a dynamic signaling method of a multi-link device (when supporting an MLD level).

FIG. 47 is a diagram illustrating an embodiment of a dynamic signaling method of a multi-link device (when supporting an MLD level).

Referring to FIG. 47, when one STA of a non-AP MLD transmits a request message for activating an announcement method to an AP of a connected AP MLD, the AP MLD can activate the announcement method for all entities in the AP MLD. The deactivation process may also be instructed in the same way.

Figure 48:
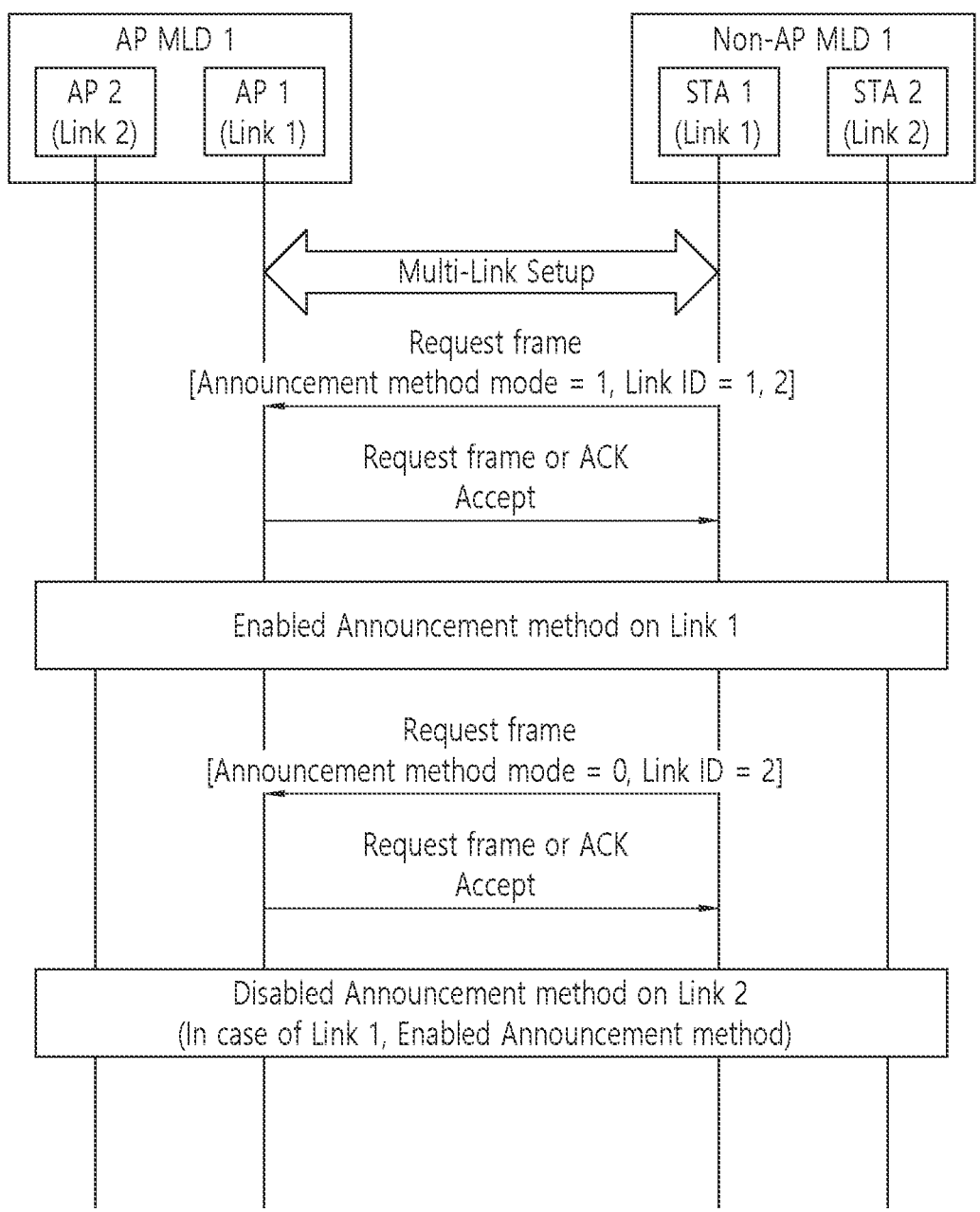
FIG. 48 is a diagram illustrating an embodiment of a dynamic signaling method of a multi-link device (when link level is supported).

FIG. 48 is a diagram illustrating an embodiment of a dynamic signaling method of a multi-link device (when link level is supported).

Referring to FIG. 48, when one STA of a non-AP MLD transmits a request message for activating an announcement method to an AP of a connected AP MLD, the AP MLD may instruct each entity within the AP MLD to activate the announcement method. At this time, if a value of "Announcement method mode"=1 and Link information to be activated are requested together, the AP activates the corresponding method only for the indicated Link. The deactivation process may also be instructed in the same way.

3-3. Semi-Static Signaling for the Announcement Method

The announcement method proposed in this specification can be indicated in a semi-static way. If the corresponding method (i.e., announcement method) is supported semi-statically, it operates as follows.

A corresponding method (i.e., announcement method) may be activated through capability negotiation (e.g., using a Support Announcement method field) in a multi-link setup process. At this time, after link setup, the corresponding mode can be freely activated or deactivated using the "Announcement method mode" field, like the dynamic signaling method described in Section 4.3.2. The semi-static signaling method may be used as a method of compromising the static signaling method and the dynamic signaling method.

4. Operation of Announcement Method in PS Mode

In this specification, announcement considering power saving is additionally considered.

If the non-AP MLD can support the Announcement method for power saving (contents of Section 2) proposed in this specification together, it operates as follows. The corresponding method can indicate activation through the signaling method proposed above. If enabled for the corresponding method, the announcement method can operate according to the PS mode enabled of the non-AP MLD. For example, when a non-AP MLD operates in Active mode, it operates based on the General Announcement method (Section 1 proposal), in case of operating in PS mode, it operates based on the announcement method for power saving (suggestions in Section 2).

On the other hand, if the non-AP MLD does not support the Announcement method for power saving (Clause 2 content) proposed in this specification together, it operates based on the existing General Announcement method (Clause 1 proposal content).

For example, when the non-AP MLD operates in Active mode, the General Announcement method operates, and when the non-AP MLD or STA operates in PS mode and enters the doze state, the announcement message is discarded or the STA Awake Announcement message pending.

5. Signaling for Additional Information

In the present specification, several methods for notifying the STA of the change or creation of critical information for the AP are defined. Such critical information can be delivered through an announcement frame or piggybacked on a separate DL frame or an existing DL frame. At this time, if critical information is included in the frame transmitted by the AP, signaling for notifying the STA of this may be defined.

"Check data" field (or subfield or element): An indicator indicating that the frame including the field contains critical information for the STA. If the corresponding value is 1, since the corresponding frame includes critical information that the STA needs to check, the STA can confirm that the corresponding Frame includes critical information that it needs to check. After confirming that the corresponding field value is 1, the STA must decode the corresponding Frame. For example, this signaling is indicated as 1 when critical information is included in the announcement frame, and the STA receiving the announcement recognizes that the announcement frame includes critical information and decodes it. In addition, this signaling can confirm that additional critical information is included in the frame in addition to the existing DL data when critical information is piggybacked in the DL Frame. The corresponding directive can be usefully used in other cases as well. If this is not the case, the corresponding value is indicated as 0. The name of the corresponding field may be defined later as a different name.

When the "Check data" field mentioned above is used together with the explicit method for announcement method (Section 4.1.1) proposed in this specification, it can be notified that critical information is present in a frame including this indicator through a corresponding field in an announcement frame or a DL frame transmitted to the STA.

"Check info" field (or subfield or element): An indicator indicating that critical information about the corresponding STA has occurred or been generated in the BSS. This field may be indicated as a non-AP MLD level or as a non-AP STA level. A non-AP MLD or non-AP STA receiving a frame in which the value of the corresponding field indicator is set to 1 can confirm that critical information necessary for it (e.g., critical update event or low latency traffic) has occurred. After confirming that the indicator corresponding to itself is 1, the STA may awake when in a doze state to obtain information through a beacon, or may obtain critical information through an info response message by transmitting an info request message. If not, the corresponding value is indicated as 0. The name of the corresponding field may be defined later as a different name.

When the "Check info" field mentioned above is used together with the implicit method for announcement method (Section 4.1.2) proposed in this specification, the STA indicated by the corresponding indicator may inform the connecting AP (or BSS) that critical information to be checked has been created or changed.

Figure 49:
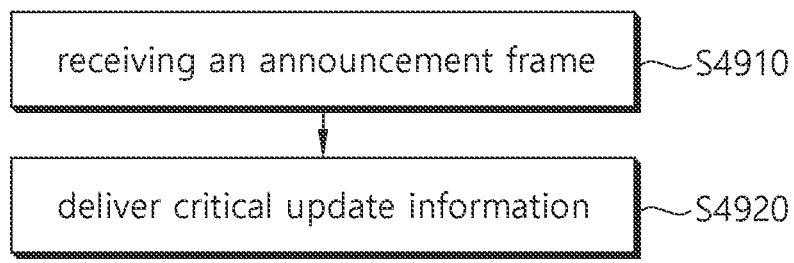
FIG. 49 is a diagram illustrating an embodiment of a STA MLD operation method.

FIG. 49 is a diagram illustrating an embodiment of a STA MLD operation method.

Referring to FIG. 49, the STA MLD may include a first STA and a second STA, and an access point (AP) MLD may include a first AP and a second AP. The first STA and the first AP may operate in a first link, the second STA and the second AP may operate in a second link, and the second STA may be in a doze state.

The STA MLD may receive a notification frame (S4910). For example, the STA MLD may receive a notification frame including information related to a critical update generated from the second AP through the first link by the first STA.

The STA MLD may deliver critical update information (S4920). For example, the second STA may obtain information related to the critical update from the first STA.

For example, the notification frame may include a management frame.

For example, the notification frame may include a beacon frame.

For example, the critical update may be generated in the second AP when the second STA is in a doze state.

For example, the critical update may include a case in which an element included in a beacon frame is changed.

For example, the critical update may include a case in which at least one of the following occurs in an element included in a beacon frame: Inclusion of a Channel Switch Announcement element, Inclusion of an Extended Channel Switch Announcement element, Modification of an enhanced distribution channel access (EDCA) parameter element, Inclusion of a Quiet element, Modification of the DSSS Parameter Set, Modification of the CF Parameter Set element, Modification of the HT Operation element, Inclusion of a Wide Bandwidth Channel Switch element, Inclusion of a Channel Switch Wrapper element, Inclusion of an Operating Mode Notification element, Inclusion of a Quiet Channel element, Modification of the VHT Operation element.

For example, the critical update may further include generation of low latency traffic.

That is, STA2 (i.e., the second STA) may operate in the PS mode and be in a doze state. For example, STA2 may receive a beacon frame by transitioning to an awake state only when receiving a beacon frame. After STA2 receives the beacon frame, when a critical update occurs in AP2 (i.e., the second AP), the STA cannot acquire information related to the critical update of AP2 until the next beacon frame is received in the existing case. However, in this embodiment, AP1 (i.e., the first AP) may transmit information related to the critical update of AP2 to the STA1 (i.e., the first STA) through an announcement frame. STA1 may deliver information related to the critical update of AP2 to STA2 through cross-link signaling. Accordingly, STA2 can acquire information related to the critical update generated in AP2 even before receiving the next beacon frame.

An embodiment of the case of using a probe response frame as an announcement frame for this is as follows.

When a channel switch (i.e., critical update) occurs in the BSS of AP(x), corresponding information may be announced through a (Broadcast) probe response. In this case, the probe response frame includes CSN information indicating that a critical update has occurred (e.g., a change sequence element) and changed parameter information (e.g., channel switch announcement) in the form shown in FIG. 15, the corresponding information can be informed through the Multi-Link element of the probe response. In the case of a non-AP MLD operating in power save mode, since the corresponding Multi-Link element contains information about reported APs (i.e., other APs) rather than information about reporting Aps, the STA may acquire change information that another STA in the doze state needs to know through the corresponding announcement frame. In addition, all critical update information (e.g., all IE information classified as a critical update event in 11be) along with CSN information indicating that a critical update has occurred for another AP may be included in the frame and notified through the corresponding probe response frame. For example, it is assumed that AP1 and AP2 of the AP MLD and STA1 and STA2 of the non-AP MLD are connected through Link 1 and Link 2, and STA2 enters the doze state due to power saving. At this time, when a critical update occurs in AP2, it should notify STA2, but since STA2 is in a doze state, STA2 must be awakened to notify it. At this time, the AP MLD provides information (broadcast) on the critical update of AP2 through a probe response frame through Link 1, so that the non-AP MLD can obtain updated information without waking STA2. Considering the multi-link characteristics of the AP MLD, the STA of the non-AP MLD can obtain critical update information about other APs through its own operating link, which can be useful for power saving. At this time, in particular, when a critical update event for AP2 occurs, AP1 can notify the changed information on AP2 through an announcement frame. At this time, a frame containing all IE information classified as a critical update event for AP2 can be transmitted. At this time, all IE information classified as a critical update event means information defined in 11be. Currently, in 11be, it is defined as "The critical updates are defined in 11.2.3.15 (TIM Broadcast) and the additional update can be added if needed." In this way, the AP MLD utilizes the multi-link feature and even when a critical update event occurs for another AP of the same AP MLD, an announcement frame including all critical update IEs defined in 11be through cross-link signaling (e.g., (Broadcast) Probe Response frame) may be provided to the STA with the latest critical update information of the AP.

Figure 50:
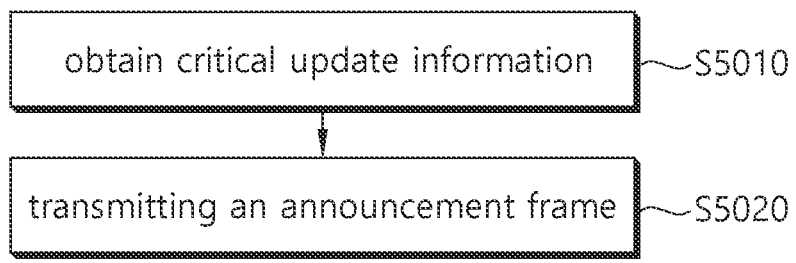
FIG. 50 is a diagram illustrating an embodiment of an AP MLD operation method.

FIG. 50 is a diagram illustrating an embodiment of an AP MLD operation method.

Referring to FIG. 50, the STA MLD may include a first STA and a second STA, and an access point (AP) MLD may include a first AP and a second AP. The first STA and the first AP may operate in a first link, the second STA and the second AP may operate in a second link, and the second STA may be in a doze state.

The AP MLD may acquire critical update information (S5010). For example, the first AP may obtain information related to a critical update generated in the second AP from the second AP.

The AP MLD may transmit a notification frame (S5020). For example, the first AP may transmit the notification frame including the information related to the critical update generated in the second AP through the first link.

For example, the notification frame may include a management frame.

For example, the notification frame may include a beacon frame.

For example, the critical update may be generated in the second AP when the second STA is in a doze state.

For example, the critical update may include a case in which an element included in a beacon frame is changed.

For example, the critical update may include a case in which at least one of the following occurs in an element included in a beacon frame: Inclusion of a Channel Switch Announcement element, Inclusion of an Extended Channel Switch Announcement element, Modification of an enhanced distribution channel access (EDCA) parameter element, Inclusion of a Quiet element, Modification of the DSSS Parameter Set, Modification of the CF Parameter Set element, Modification of the HT Operation element, Inclusion of a Wide Bandwidth Channel Switch element, Inclusion of a Channel Switch Wrapper element, Inclusion of an Operating Mode Notification element, Inclusion of a Quiet Channel element, Modification of the VHT Operation element.

For example, the critical update may further include generation of low latency traffic.

Some of the detailed steps shown in the examples of FIGS. 49 and 50 may not be essential steps and may be omitted. In addition to the steps shown in FIGS. 49 and 50, other steps may be added, and the order of the steps may be changed. Some of the above steps may have their own technical meaning.

The technical features of the present disclosure may be applied to various devices and methods. For example, the technical features of the present disclosure may be performed/supported through the device(s) of FIG. 1 and/or FIG. 5. For example, the technical features of the present disclosure may be applied to only part of FIG. 1 and/or FIG. 5. For example, the technical features of the present disclosure may be implemented based on the processing chip(s) 114 and 124 of FIG. 1, or implemented based on the processor(s) 111 and 121 and the memory(s) 112 and 122, or implemented based on the processor 610 and the memory 620 of FIG. 5. For example, in the device of the present specification, the device includes a memory and a processor operably coupled to the memory, the processor may be configured to receive a physical protocol data unit (PPDU) including basic service set (BSS) load information from an access point (AP), wherein the BSS load information includes the number of STAs connected to the BSS of the AP and information related to the number of enabled STAs among STAs connected to the BSS of the AP; and decode the PPDU.

The technical features of the present disclosure may be implemented based on a computer readable medium (CRM). For example, a CRM according to the present disclosure is at least one computer readable medium including instructions designed to be executed by at least one processor. The CRM may store instructions that perform operations including receiving a physical protocol data unit (PPDU) including basic service set (BSS) load information from an access point (AP), wherein the BSS load information includes the number of STAs connected to the BSS of the AP and information related to the number of enabled STAs among STAs connected to the BSS of the AP; and decoding the PPDU.

At least one processor may execute the instructions stored in the CRM according to the present disclosure. At least one processor related to the CRM of the present disclosure may be the processor 111, 121 of FIG. 1, the processing chip 114, 124 of FIG. 1, or the processor 610 of FIG. 5. Meanwhile, the CRM of the present disclosure may be the memory 112, 122 of FIG. 1, the memory 620 of FIG. 5, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed in a non-access point (non-AP) multi-link device (MLD) in a wireless local area network (WLAN) system, the method comprising:
    receiving, by a first non-AP STA affiliated with the non-AP MLD from a first access point (AP) affiliated with an AP MLD, a notification frame including information related to a critical update for a second AP affiliated with the AP MLD;
    acquiring, by a second non-AP STA affiliated with the non-AP MLD from the first non-AP STA, the information related to the critical update for the second AP based on the notification frame; and
    maintaining, by the second non-AP STA, a doze state even while the second non-AP STA has acquired the information related to the critical update for the second AP,
    wherein the first non-AP STA always operates in an awake state, and
    wherein the second non-AP STA operates in a power saving (PS) mode and changes from the doze state to the awake state only based on the second non-AP STA receiving a beacon frame.

2. The method of claim 1, wherein the first AP affiliated with the AP MLD operating in a first link and the second AP operating in a second link are affiliated with the AP MLD, and
    wherein the first non-AP STA operating in the first link and the second non-AP STA operating in the second link are affiliated with the non-AP MLD.

3. The method of claim 2, further comprising:
    receiving, by the second non-AP STA, the beacon frame from the second AP,
    wherein the critical update for the second AP is occurred after receiving the beacon frame, and
    wherein the information related to the critical update is acquired before receiving a next beacon frame from the second AP.

4. The method of claim 1, wherein the critical update includes a case in which at least one of the following occurs in an element included in the beacon frame:
    Inclusion of a Channel Switch Announcement element, Inclusion of an Extended Channel Switch Announcement element, Modification of an enhanced distribution channel access (EDCA) parameter element, Inclusion of a Quiet element, Modification of the DSSS Parameter Set, Modification of the CF Parameter Set element, Modification of the HT Operation element, Inclusion of a Wide Bandwidth Channel Switch element, Inclusion of a Channel Switch Wrapper element, Inclusion of an Operating Mode Notification element, Inclusion of a Quiet Channel element, Modification of the VHT Operation element.

5. The method of claim 1, wherein the critical update further includes a generation of low latency traffic.

6. A non-access point (non-AP) multi-link device (MLD) configured to operate in a wireless local area network (WLAN) system,
    the non-AP MLD comprises:
    a transceiver for transmitting and receiving radio signals;
    at least one processor connected to the transceiver; and
    at least one memory connected to the at least one processor and storing instructions that, based on being executed by the at least one processor, perform operations comprising:
    receiving, by a first non-AP STA affiliated with the non-AP MLD, a notification frame including information related to a critical update for a second AP affiliated with an AP MLD from a first AP affiliated with the AP MLD;
    acquiring, by a second non-AP STA affiliated with the non-AP MLD from the first non-AP STA, the information related to the critical update for the second AP based on the notification frame; and
    maintaining, by the second non-AP STA, a doze state even while the second non-AP STA has acquired the information related to the critical update for the second AP,
    wherein the first non-AP STA always operates in an awake state, and
    wherein the second non-AP STA operates in a power saving (PS) mode and changes from the doze state to the awake state only based on the second non-AP STA receiving a beacon frame.

7. The non-AP MLD of claim 6, wherein the first AP operating in a first link and the second AP operating in a second link are affiliated with the AP MLD, and
    wherein the first non-AP STA operating in the first link and the second non-AP STA operating in the second link are affiliated with the non-AP MLD.

8. The non-AP MLD of claim 7, wherein the operations further comprise:
    receiving, by the second non-AP STA, the beacon frame from the second AP,
    wherein the critical update for the second AP is occurred after receiving the beacon frame, and
    wherein the information related to the critical update is acquired before receiving a next beacon frame from the second AP.

9. The non-AP MLD of claim 6, wherein the critical update includes a case in which at least one of the following occurs in an element included in the beacon frame:
    Inclusion of a Channel Switch Announcement element, Inclusion of an Extended Channel Switch Announcement element, Modification of an enhanced distribution channel access (EDCA) parameter element, Inclusion of a Quiet element, Modification of the DSSS Parameter Set, Modification of the CF Parameter Set element, Modification of the HT Operation element, Inclusion of a Wide Bandwidth Channel Switch element, Inclusion of a Channel Switch Wrapper element, Inclusion of an Operating Mode Notification element, Inclusion of a Quiet Channel element, Modification of the VHT Operation element.

10. The non-AP MLD of claim 6, wherein the critical update further includes a generation of low latency traffic.

11. A method performed in an access point (AP) multi-link device (MLD) in a wireless local area network (WLAN) system, the method comprising:
- obtaining, by a first AP affiliated with the AP MLD, information related to a critical update for a second AP affiliated with the AP MLD; and
- transmitting, by the first AP to a first non-access point (non-AP) station (STA) affiliated with a non-AP MLD, a notification frame including the information related to the critical update for the second AP,
- wherein the information related to the critical update is acquired by a second non-AP STA from the first non-AP STA while the second non-AP STA is in a doze state,
- wherein the first non-AP STA always operates in an awake state, and
- wherein the second non-AP STA operates in a power saving (PS) mode and changes from the doze state to the awake state only based on the second non-AP STA receiving a beacon frame.

* * * * *